(12) United States Patent  
Okumura

(10) Patent No.: US 7,477,296 B2  
(45) Date of Patent: Jan. 13, 2009

(54) DATA RECORDING APPARATUS AND DIGITAL CAMERA

(75) Inventor: Yoichiro Okumura, Hino (JP)

(73) Assignee: Olympus Corporation, Tokyo (JP)

( * ) Notice: Subject to any disclaimer, the term of this patent is extended or adjusted under 35 U.S.C. 154(b) by 700 days.

(21) Appl. No.: 11/001,590

(22) Filed: Dec. 1, 2004

(65) Prior Publication Data

US 2005/0123270 A1    Jun. 9, 2005

(30) Foreign Application Priority Data

Dec. 8, 2003   (JP)   ............................. 2003-408699
Dec. 8, 2003   (JP)   ............................. 2003-408700

(51) Int. Cl.
   *H04N 5/76*   (2006.01)
(52) U.S. Cl. .............................. 348/231.99; 348/231.2; 348/231.3; 348/231.8; 396/321
(58) Field of Classification Search .............. 348/231.2, 348/231.3, 231.7, 231.8, 231.9
   See application file for complete search history.

(56) References Cited

U.S. PATENT DOCUMENTS

| 5,153,730 | A  | * | 10/1992 | Nagasaki et al. ......... 348/231.6 |
| 5,699,549 | A  | * | 12/1997 | Cho ........................... 711/115 |
| 5,999,697 | A  | * | 12/1999 | Murase et al. .............. 386/101 |
| 6,601,766 | B2 | * | 8/2003  | Nakagawa et al. .......... 235/451 |
| 6,873,367 | B1 | * | 3/2005  | Hirata et al. ................ 348/372 |
| 6,897,894 | B1 | * | 5/2005  | Miyazawa ............... 348/231.8 |
| 6,927,794 | B2 | * | 8/2005  | Kubo et al. .............. 348/231.8 |
| 6,933,969 | B1 | * | 8/2005  | Noguchi et al. .......... 348/220.1 |
| 7,042,504 | B1 | * | 5/2006  | Toyofuku et al. ......... 348/231.1 |
| 2001/0012064 | A1 | * | 8/2001 | Kubo .......................... 348/231 |
| 2001/0041048 | A1 | * | 11/2001 | Ando et al. ................... 386/46 |
| 2002/0063895 | A1 | * | 5/2002 | Agata et al. ................ 358/1.16 |
| 2003/0025805 | A1 | * | 2/2003 | Yamagishi ............... 348/222.1 |

FOREIGN PATENT DOCUMENTS

| JP | 7-307077    | 11/1995 |
| JP | 2000-333066 | 11/2000 |
| JP | 2001-86462  | 3/2001  |
| JP | 2001-111939 | 4/2001  |
| JP | 2001-169225 | 6/2001  |
| JP | 2001-177745 | 6/2001  |
| JP | 2003-143456 | 5/2003  |

OTHER PUBLICATIONS

Chinese Office Action for application No. 200410100121.X, issued Dec. 8, 2006 (11 pgs.) (with English Translation (16 pgs.)).
Notice of Reasons for Rejection for Japanese Patent Application Publication No. 2003-408699, mailed Oct. 7, 2008 (3 pgs.) with translation (4 pgs.).

* cited by examiner

*Primary Examiner*—David Ometz
*Assistant Examiner*—Quang V Le
(74) *Attorney, Agent, or Firm*—STraub & Pokotylo; JOhn C. Pokotylo

(57) ABSTRACT

A data recording apparatus comprises a plurality of recording media, data generating means for generating recording data, recording means for, whenever the recording data is generated from the data generating means, allocating and recording the recording data in the plurality of recording media, and data transfer means for integrating, into one recording medium, the plurality of recording data recorded in a distributed manner in the plurality of recording media, when the data generating means and the recording means are not in operation.

15 Claims, 24 Drawing Sheets

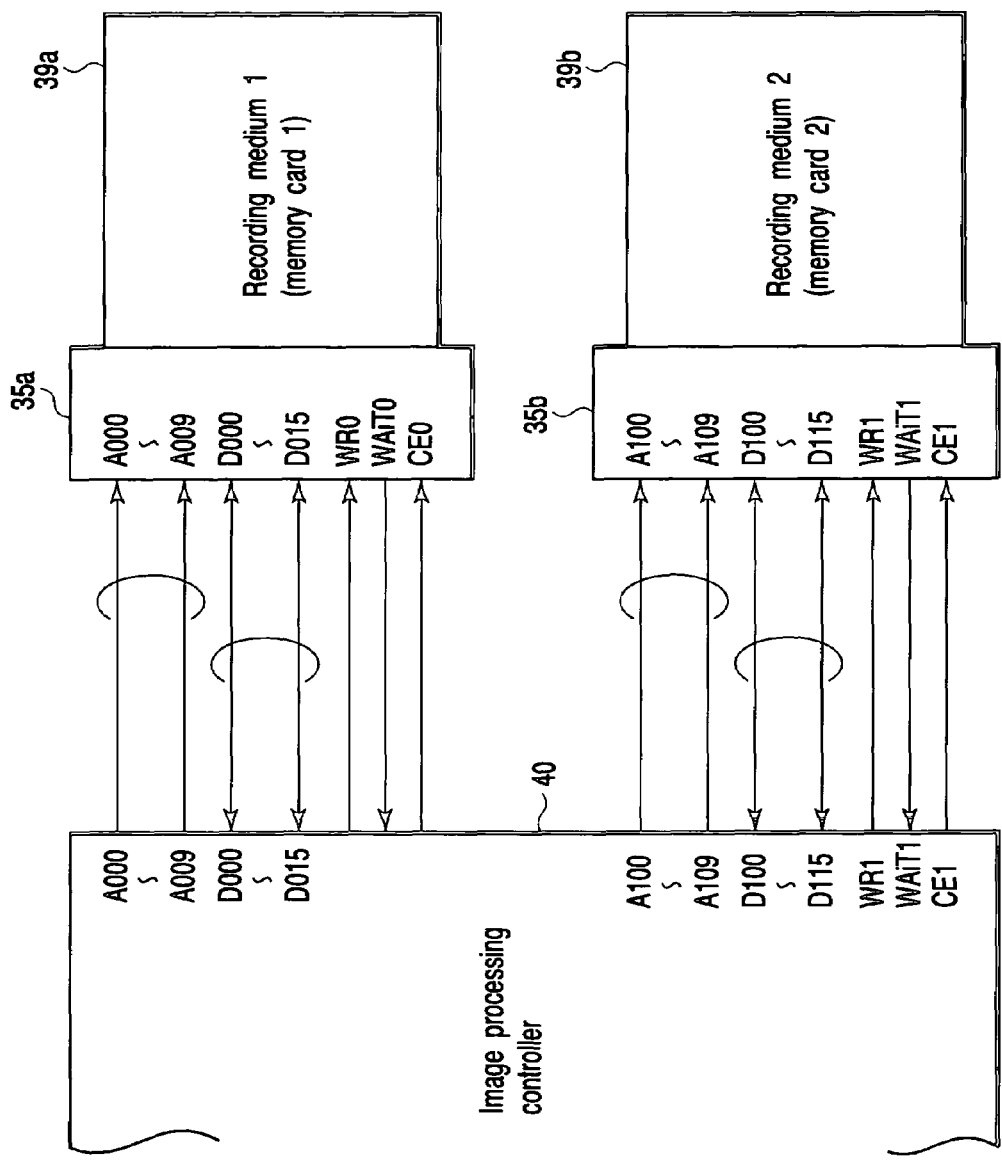
F I G. 13

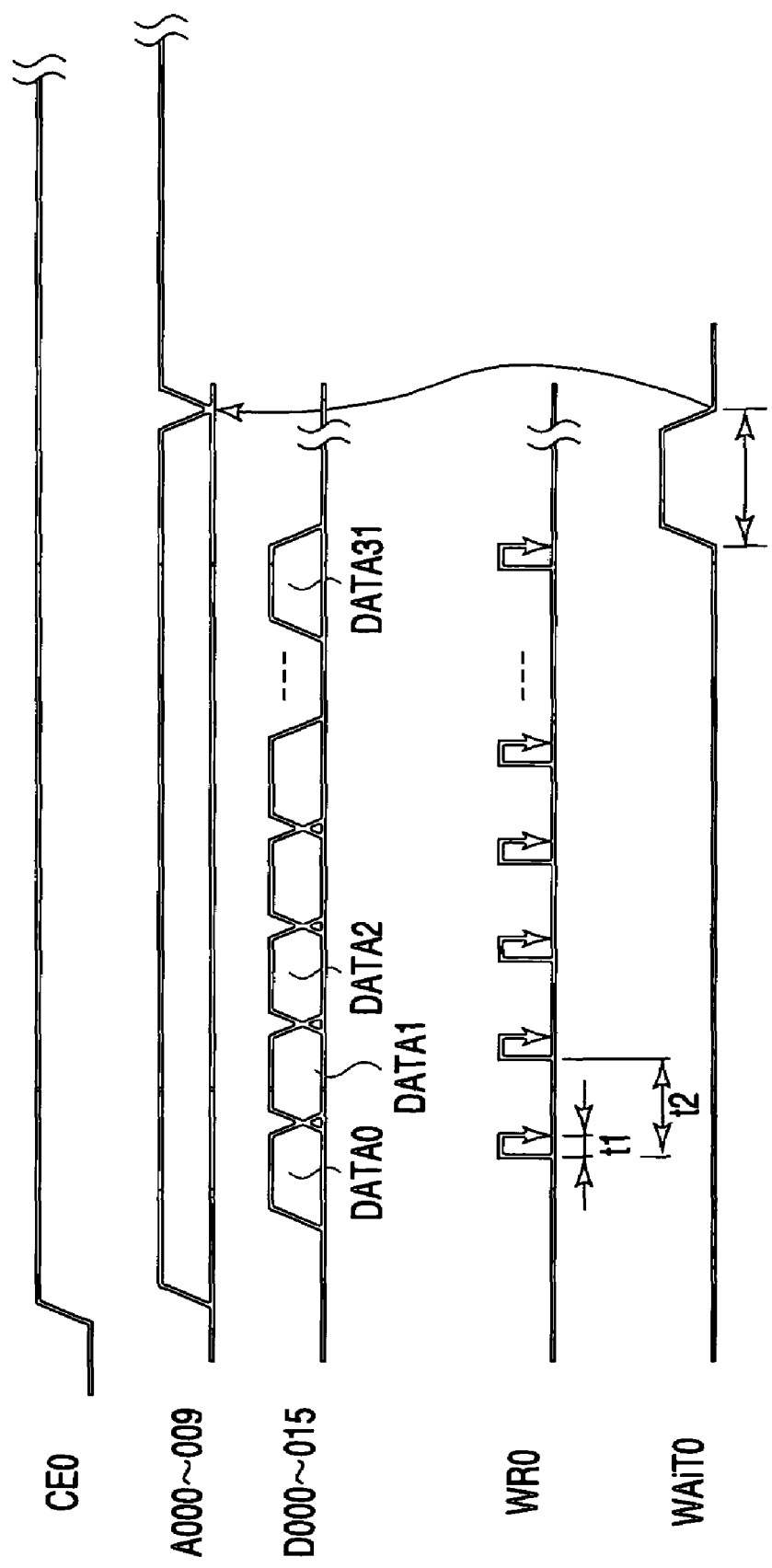
F I G. 15

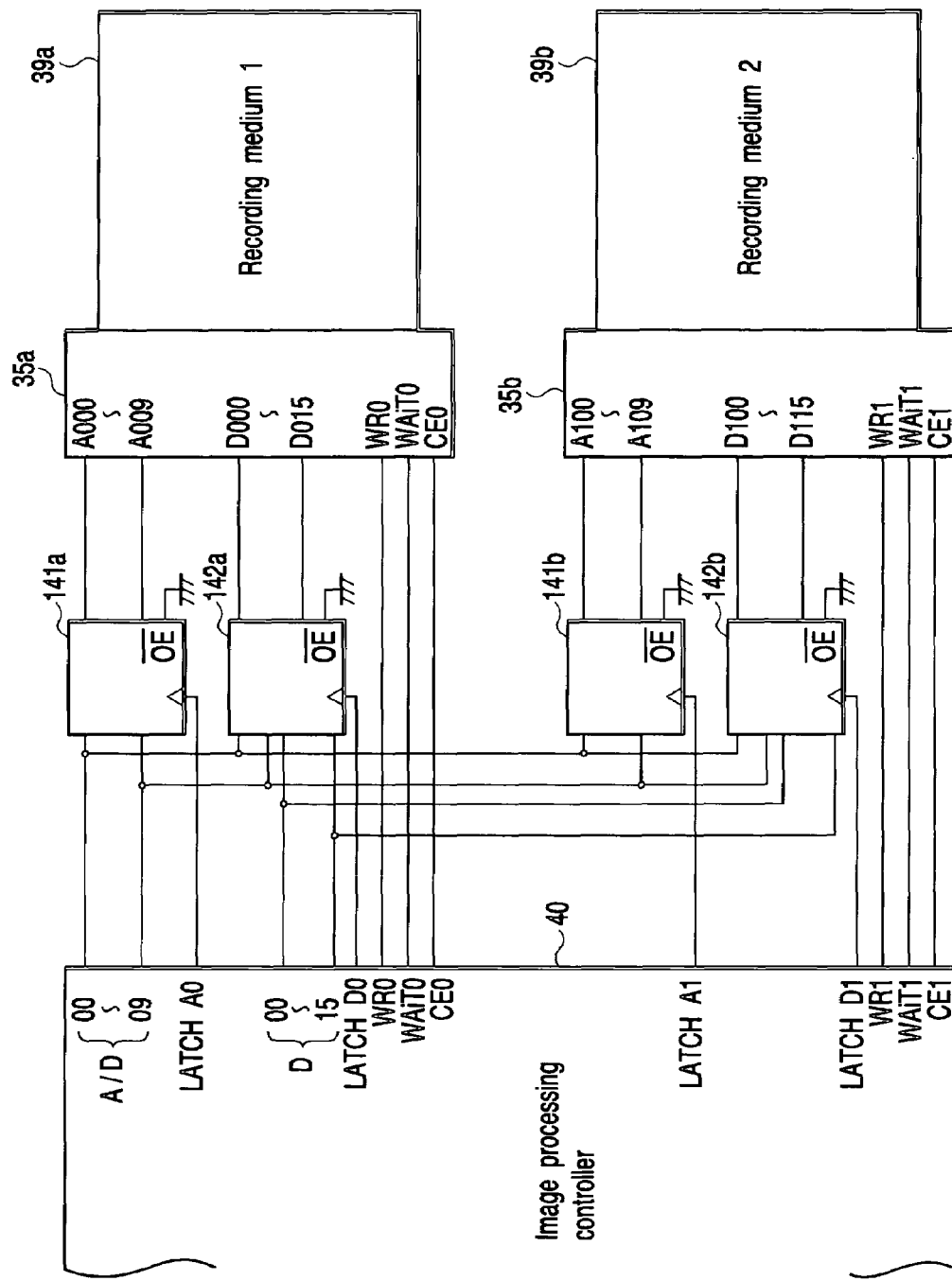
F I G. 16

| Input | | | Output |
|---|---|---|---|
| $\overline{OE}$ | CK | D | |
| H | X | X | Z |
| L | ↧ | X | Qn |
| L | ↥ | L | L |
| L | ↥ | H | H |

X : No influence
Z : High impedance
Qn : No change (n = 0~15)

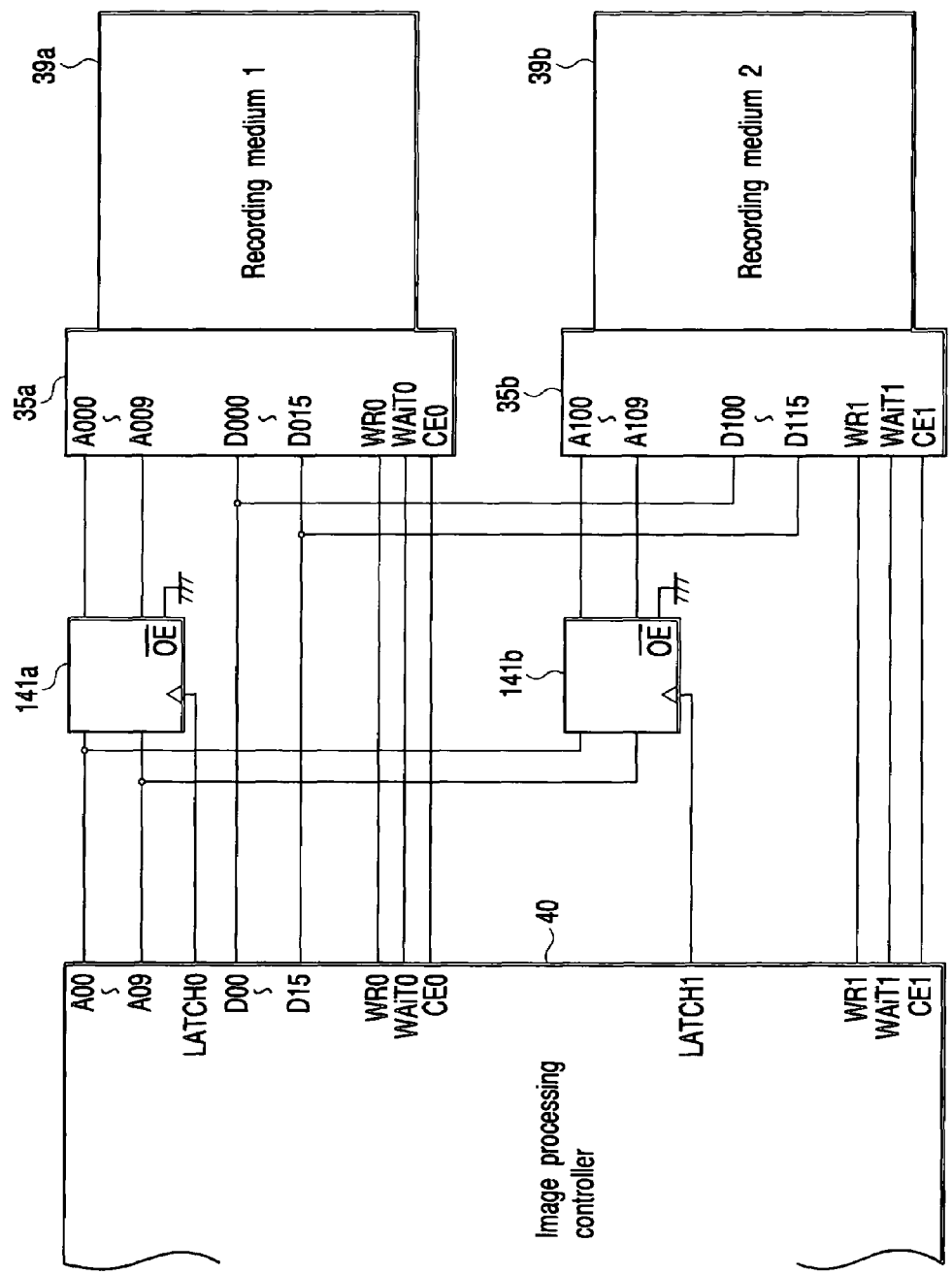
F I G. 22

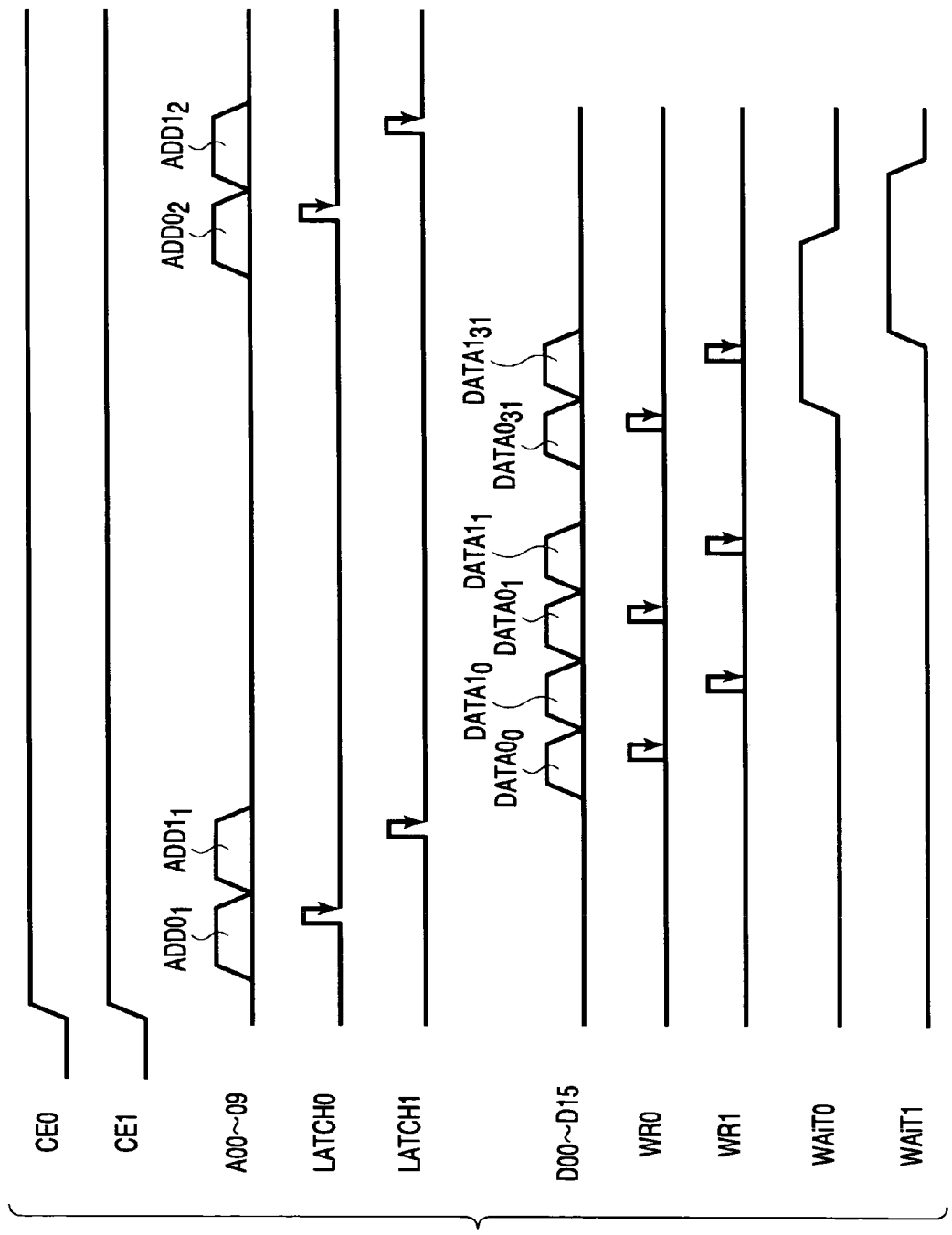
F I G. 2 3

DATA RECORDING APPARATUS AND DIGITAL CAMERA

CROSS-REFERENCE TO RELATED APPLICATIONS

This application is based upon and claims the benefit of priority from prior Japanese Patent Applications No. 2003-408699, filed Dec. 8, 2003; and No. 2003-408700, filed Dec. 8, 2003, the entire contents of both of which are incorporated herein by reference.

BACKGROUND OF THE INVENTION

1. Field of the Invention

The present invention relates to a technique to efficiently transfer data to a plurality of recording media, and relates to a digital camera in which this technique is applied.

2. Description of the Related Art

In personal computers, for example, a technique is employed in which when data is to be stored, the data is divided and stored in a plurality of hard disc drives (HDDs) to reduce write time of the data in order to enhance performance of a system.

This technique for efficiency in data transfer time is also highly needed in digital cameras. For example, a digital camera has been proposed which allows two memory cards to be attached thereto and which allows a user to easily manage the attached memory cards without causing the user to be conscious of which memory card is inserted into which slot (Jpn. Pat. Appln. KOKAI Publication No. 2001-169225).

BRIEF SUMMARY OF THE INVENTION

A data recording apparatus according to a first aspect of the present invention comprises: a plurality of recording media; data generating means for generating recording data; recording means for, whenever the recording data is generated from the data generating means, allocating and recording the recording data in the plurality of recording media; and data transfer means for integrating, into one recording medium, the plurality of recording data recorded in a distributed manner in the plurality of recording media, when the data generating means and the recording means are not in operation.

A data recording apparatus according to a second aspect of the present invention comprises: a plurality of detachable recording means; data generating means for generating recording data; judging means for judging whether or not a combination of the plurality of recording means is proper; and recording means for recording the recording data generated by the data generating means in the plurality of recording means in a distributed manner when the combination of the plurality of recording means is judged to be proper.

A digital camera according to the first aspect of the present invention comprises: a plurality of recording media; data generating means for generating recording data; recording means for, whenever the recording data is generated from the data generating means, allocating and recording the recording data in the plurality of recording media; and data transfer means for integrating, into one recording medium, the plurality of recording data recorded in a distributed manner in the plurality of recording media, when the data generating means and the recording means are not in operation.

A digital camera according to the second aspect of the present invention comprises: a plurality of detachable recording means; data generating means for generating recording data; judging means for judging whether or not a combination of the plurality of recording means is proper; and recording means for recording the recording data generated by the data generating means in the plurality of recording means in a distributed manner when the combination of the plurality of recording means is judged to be proper.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 13 is a diagram showing signal connection between recording media and an image processing controller;

FIG. 15 is a diagram representing a timing chart of data exchange signals between the image processing controller and the recording medium;

FIG. 16 is a diagram showing the signal connection between the recording media and the image processing controller;

FIG. 22 is a diagram showing the signal connection between the recording media and the image processing controller;

FIG. 23 is a diagram representing a timing chart of the data exchange signals between the image processing controller and the recording media;

DETAILED DESCRIPTION OF THE INVENTION

Figure 1:
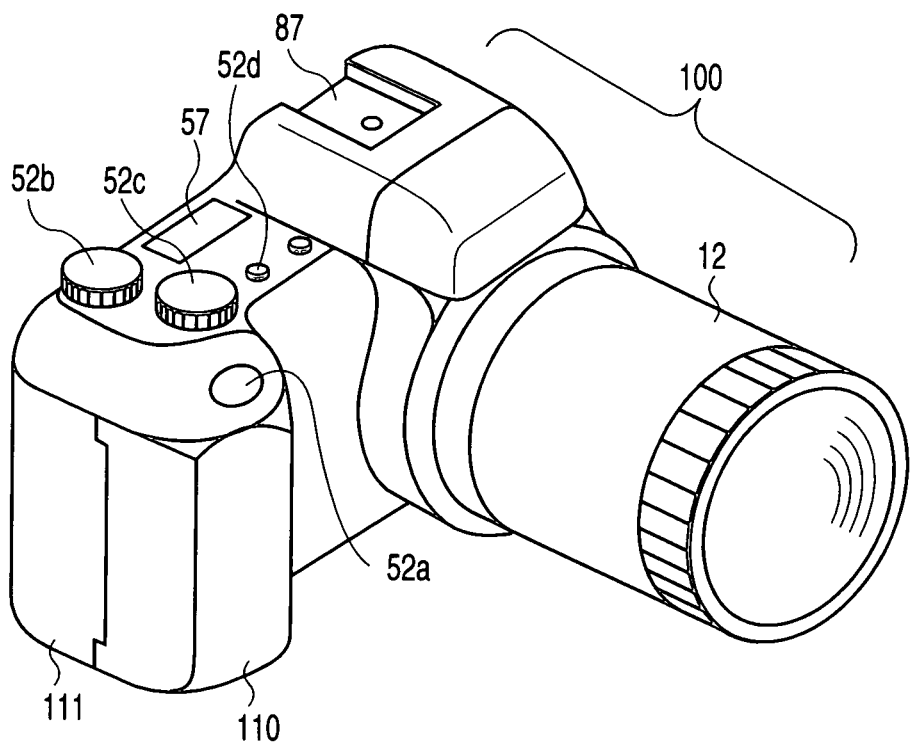
FIG. 1 is a perspective view of a digital camera to which a data recording apparatus in a first embodiment of the present invention is applied.

FIG. 1 is a perspective view of a digital camera to which a data recording apparatus in a first embodiment of the present invention is applied.

The present digital camera comprises a body unit 100, a lens unit 12 and a flash unit (not shown) 80.

Further, the body unit 100 comprises a camera operating switch 52, an operation displaying LCD 57, a flash attaching shoe 87 and a grip portion 110.

The camera operating switch 52 is provided with a release button 52a, a setting dial 52b, a mode dial 52c and a power switch 52d.

The release button 52a starts focusing and photographing operations. The setting dial 52b sets the shutter speed and aperture. The mode dial 52c sets exposure modes such as an aperture priority mode, a shutter priority mode and a manual mode. The power switch 52d is a switch to turn on/off a power supply.

In the grip portion 110 for a photographer to grip the body unit 100, there is provided a mechanism to store a memory card 120 which will be hereinafter described, a power supplying battery 54 and the like.

Figure 2:
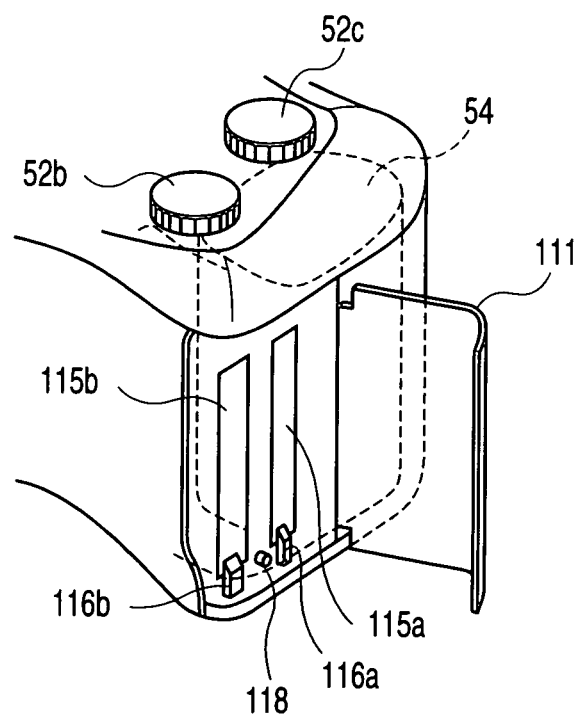
FIG. 2 is a perspective view looking obliquely from behind at an opened card cover of a grip portion.

FIG. 2 is a perspective view looking obliquely from behind at an opened card cover 111 of the grip portion 110. In the grip portion 110, there are provided insert portions 115a, 115b, eject levers 116a, 116b and a packed state detection switch 118.

The insert portions 115a, 115b allow the memory card 120 to be inserted into slots of recording media (hereinafter described). The eject levers 116a, 116b eject the memory card 120 from the insert portions 115a, 115b. The packed state detection switch 118 detects whether or not the memory card 120 is in an inserted state.

Figure 3:
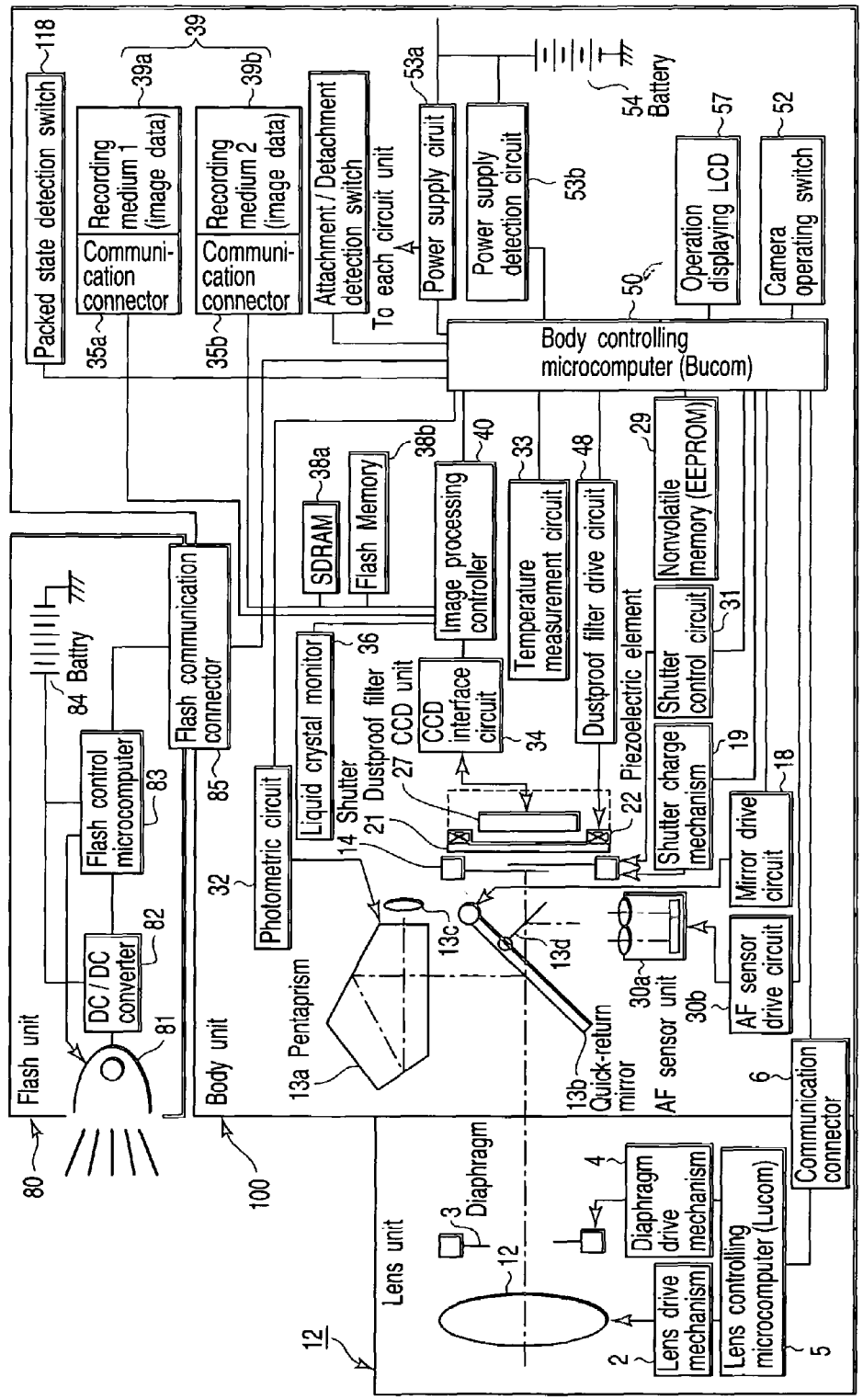
FIG. 3 is a diagram showing a system configuration of the digital camera.

Next, a system configuration of the present digital camera will be described referring to FIG. 3.

The system of this digital camera comprises the body unit 100 as a camera main body, the exchangeable lens unit 12 which is an accessory device (hereinafter abbreviated to "accessory"), a recording medium 39 to record taken image data, the external flash unit 80, and the like.

The lens unit 12 desired by a user is detachably set via a lens mount (not shown) provided in front of the body unit 100.

The recording medium 39 is an external recording medium such as various memory cards or external HDDs, and a plurality of recording media 39a, 39b is prepared and they are attached, via communication connectors 35a, 35b, to the camera main body in a manner to be able to communicate and to be exchanged.

The flash unit 80 comprises a flashtube 81, a DC/DC converter 82, a flash control microcomputer 83 and a battery 84, and can be attached to the camera main body in a manner to be able to communicate via a flash communication connector 85.

The lens unit 12 is controlled by a lens controlling microcomputer (hereinafter referred to as "Lucom") 5. The body unit 100 is controlled by a body controlling microcomputer (hereinafter referred to as "Bucom") 50. It is to be noted that the Lucom 5 and the Bucom 50, when combined, are electrically connected in a manner to be able to communicate via a communication connector 6. Thus, the Lucom 5 cooperates dependently with the Bucom 50 to operate as a camera system.

A taking lens 12a and a diaphragm 3 are provided in the lens unit 12. The taking lens 12a is driven by an unshown DC motor in a lens drive mechanism 2. The diaphragm 3 is driven by an unshown stepping motor in a diaphragm drive mechanism 4. The Lucom 5 controls each of these motors in accordance with an instruction of the Bucom 50.

The following components are provided in the body unit 100 as shown in the drawing. For example, there are provided single lens reflex system components as an optical system, a shutter 14, and an AF sensor unit 30a to receive light flux reflected from a sub mirror 13d for ranging. As the single lens reflex system components as the optical system, there are provided a pentaprism 13a, a quick-return mirror 13b, an eyepiece 13c and the sub mirror 13d. Subsequently to the focal plane type shutter 14, a CCD 27 is provided via a dustproof filter 21, for photoelectric transfer of a subject image which has passed through the optical system.

Furthermore, the dustproof filter 21 is provided with a piezoelectric element 22, and the piezoelectric element 22 is vibrated by a dustproof filter drive circuit 48 to remove dust sticking to the dustproof filter 21. It is to be noted that because the piezoelectric element 22 changes its characteristics with temperature, the Bucom 50 supplies a proper drive signal to the dustproof filter drive circuit 48 in accordance with a temperature measured by a temperature measurement circuit 33.

In the body unit 100, there are further provided an AF sensor drive circuit 30b, a mirror drive mechanism 18, a shutter charge mechanism 19, a shutter control circuit 31 and a photometric circuit 32.

The AF sensor drive circuit 30b drives and controls this AF sensor unit 30a. The mirror drive mechanism 18 drives and controls the quick-return mirror 13b. The shutter charge mechanism 19 drives a first (front) curtain and a second (rear) curtain of the shutter 14. The shutter control circuit 31 controls the motion of the first (front) curtain and the second (rear) curtain. The photometric circuit 32 performs photometric processing based on light flux from the pentaprism 13a.

Furthermore, the shutter charge mechanism 19 and the shutter control circuit 31 exchange with the Bucom 50 signals to control the open/close operation of the shutter.

This camera system is also provided with an image processing controller 40 which performs image processing by use of a CCD interface circuit 34 connected to the CCD 27, a liquid crystal monitor 36, and a SDRAM 38a, a flash memory 38b, the recording media 39a, 39b and the like that are provided as storage areas. Further, this camera system is configured so that it can provide an electronic recording display function as well as an electronic image pickup function.

The recording media 39a, 39b are connected to the image processing controller 40 via the communication connectors 35a, 35b, respectively, to exchange image pickup data. The packed state detection switch 118 which detects whether or not the memory cards 120 as the recording media 39a, 39b are inserted as a pack is connected to the Bucom 50.

The Bucom 50 is provided with the operation displaying LCD 57 which notifies the user of the operation state of the camera through a display output, and the camera operating switch 52. The camera operating switch 52 is a switch group including operation buttons necessary to operate the camera, such as the release button 52a, the mode dial 52c and the power switch 52d. There are further provided the battery 54 as a power supply, a power supply circuit 53a which supplies the voltage of the power supply after converting it to a voltage required by each circuit unit of the camera system, and a power supply detection circuit 53b.

Each part of the camera system configured as described above operates as follows.

The mirror drive mechanism 18 is a mechanism to drive the quick-return mirror 13b to an up position and a down position. When this quick-return mirror 13b is at the down position, light flux from the taking lens 12a is split and led to the AF sensor unit 30a side and the pentaprism 13a side.

An output from an AF sensor in the AF sensor unit 30a is fed to the Bucom 50 via the AF sensor drive circuit 30b for known ranging processing.

Furthermore, the user can view a subject from the eyepiece 13c adjacent to the pentaprism 13a. On the other hand, part of the light flux which has passed through this pentaprism 13a leads to a photosensor (not shown) within the photometric circuit 32, and on the basis of a light volume detected therein, the known ranging processing is performed.

The shutter control circuit 31 receives a signal to drive and control the shutter from the Bucom 50, and controls the operation of the shutter 14 in accordance with the signal. Further, the shutter control circuit 31 outputs, to a Bucom 150 at a predetermined time, a flash timing signal to cause the flash to emit light. The Bucom 50 outputs a light emission command signal to the flash unit 80 via communication in accordance with this flash timing signal.

The image processing controller 40 controls the CCD interface circuit 34 in accordance with the command of the Bucom 50 to load image data from the CCD 27. This image data is converted to a video signal by the image processing controller 40, and output to and displayed on the liquid crystal monitor 36. The user can check a taken image from an image displayed on the liquid crystal monitor 36.

The SDRAM 38a is a memory to temporarily store image data, and is used as a work area or the like when the image data is converted. Further, this image data is set, after converted into JPEG data, to be stored in the recording media 39a, 39b. When storing image data taken in a sequential shooting mode, the image processing controller 40 controls a data transfer operation so that the image data is efficiently stored.

Figure 4:
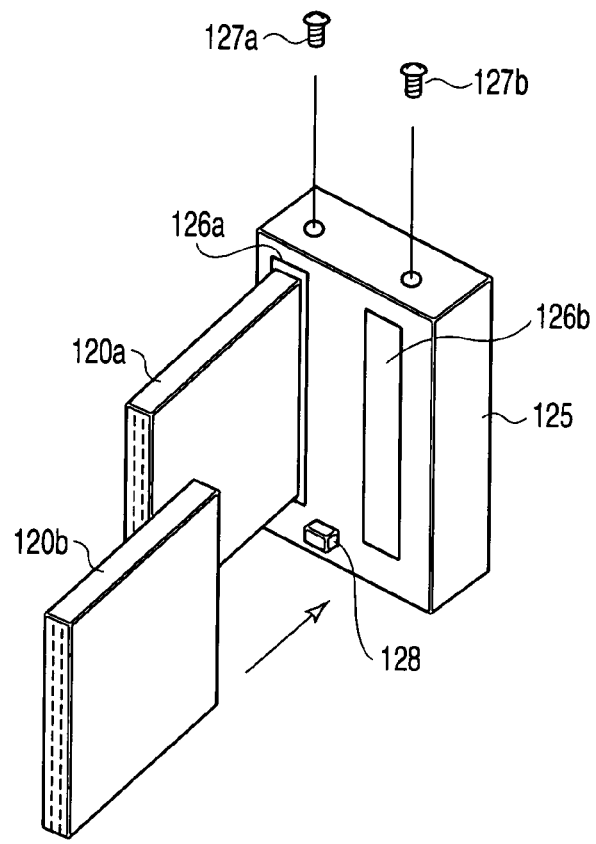
FIG. 4 is a diagram showing how to equip an adapter with memory cards.

FIG. 4 is a diagram showing how to equip an adapter 125 with memory cards 120a, 120b.

The memory cards 120a, 120b are respectively inserted into insert portions 126a, 126b provided in the adapter 125 which is a binding member, and are fixed by use of fixing screws 127a, 127b. Thus, the plurality of memory cards 102 loaded in the adapter 125 is integrally installed into the insert portions 115a, 115b of the body unit 100 described above.

In the meantime, a protrusion 128 provided in the adapter 125 presses the packed state detection switch 118 shown in FIG. 2, thereby detecting that the adapter 125 is installed.

It is to be noted that the adapter 125 can be equipped with a plurality of memory cards without limiting to two memory cards. In addition, the fixing screws may be adapted to be attached to side surfaces of the adapter 125.

Furthermore, the memory cards 120a, 120b may be fixed to the adapter 125 by friction rather than the fixing screws, and may also be fixed to the adapter 125 by use of a pinch mechanism. Integral molding is also conceived.

Figure 5:
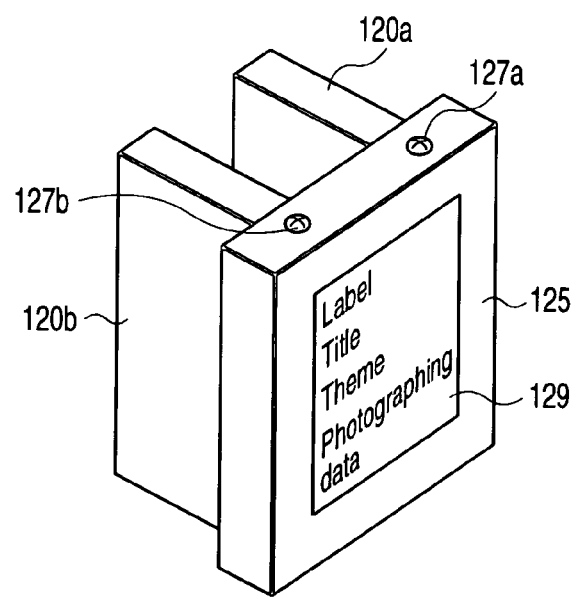
FIG. 5 is a diagram showing the backside of the adapter equipped with the memory cards.

FIG. 5 is a diagram showing a backside of the adapter 125 equipped with the memory cards 120a, 120b. A label is provided on the back of the adapter 125, on which information (e.g., title, theme, photographing date) on the image data stored in the memory cards 120a, 120b can be written down. This makes it easy to organize data and to check contents. Naturally, the two memory cards may be installed without using such an adapter.

Figure 6:
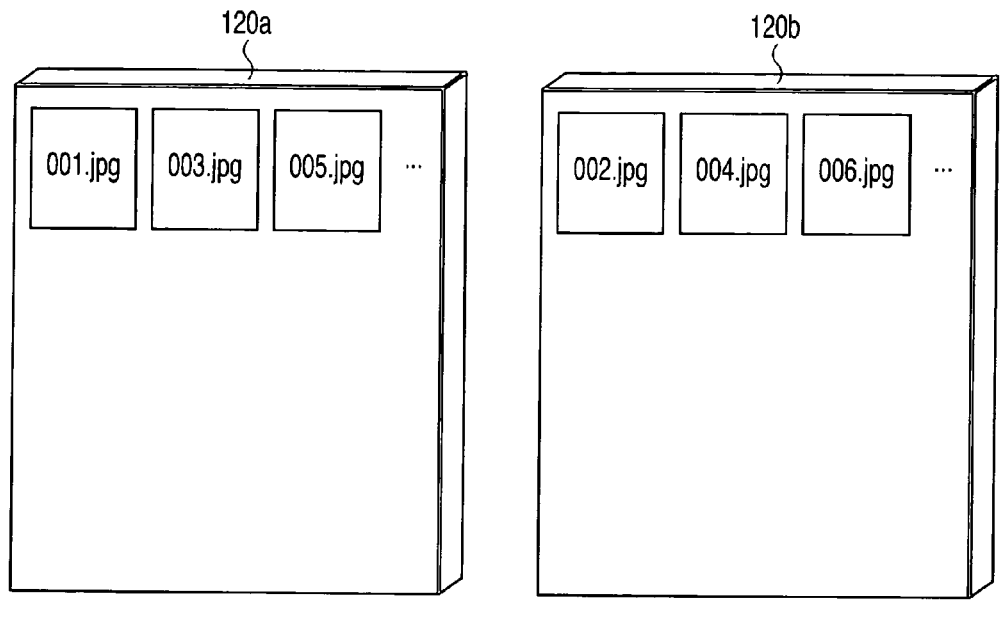
FIG. 6 is a diagram showing image data recorded in the memory cards.

FIG. 6 is a diagram showing image data recorded in the memory cards 120a, 120b. As shown in this drawing, the image data is generally recorded in a distributed manner in a plurality of memory cards and is not recorded in order. As a consequence, it may often be difficult to manage data separately on each of the memory cards 120a, 120b. In particular, when the memory cards 120a, 120b are separately kept together with other memory cards, it is difficult to extract the memory cards belonging to the same group.

In the present embodiment, as the memory cards 120a, 120b are kept and handled integrally with the adapter 125, data can be easily managed. In addition, since the label is provided, it is easy to know the contents and to organize the data.

Figure 7:
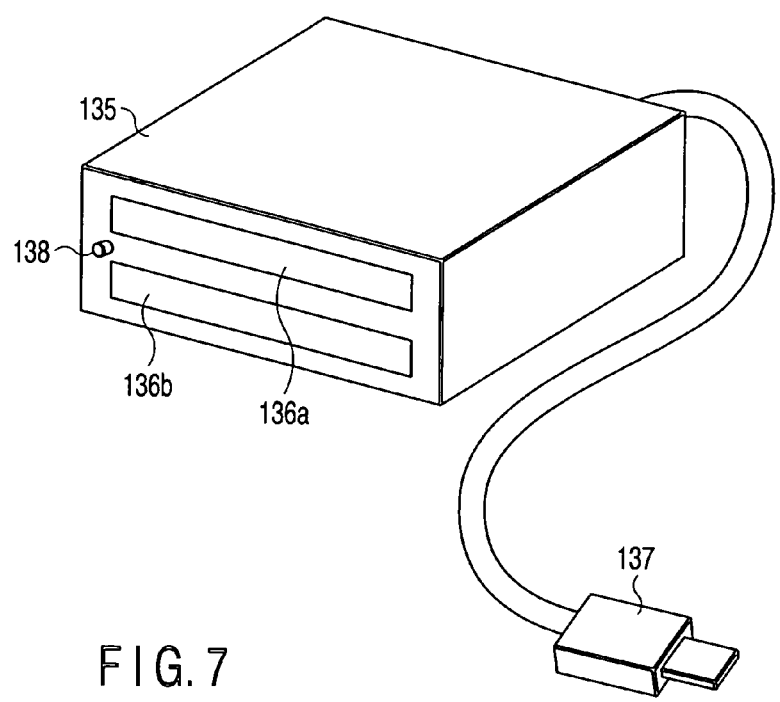
FIG. 7 is a diagram showing a memory card reader.

FIG. 7 is a diagram showing a memory card reader 135 to read the data recorded in the memory cards 120a, 120b through other equipment such as a PC.

The memory card reader 135 is provided with insert portions 136a, 136b to insert the memory cards 120a, 120b, and a packed state detection switch 138 to detect whether or not the memory cards 120a, 120b are inserted together with the adapter 125.

Furthermore, data in the memory cards 120a, 120b is transferred to the PC (not shown) via a connection plug 137. Conversely, data in the PC is transferred to the memory cards 120a, 120b via the connection plug 137.

FIG. 8, FIG. 9, FIG. 11 and FIG. 10 are schematic flowcharts showing transfer and recording operations of the image data in the digital camera. These operations are generally controlled by the Bucom 50 shown in FIG. 3.

When the battery of the digital camera is loaded in step S01, an internal data area is initialized in step S02. More specifically, work areas of the SDRAM 38a and the flash memory 38b, and a communication port are initialized.

The state of the power switch 52d is checked, and if Yes in step S03, that is, when the power switch 52d is turned on and power is supplied to each part of the digital camera leading to an operable state, the memory cards 120a (card 1), 120b (card 2) as the recording media 39a, 39b are checked to see whether or not they are connected, in steps S04 and S06.

If Yes in steps S04 and S06, that is, if the memory cards 120a, 120b are connected, File Allocation Table (FAT) information in the connected memory cards 120a, 120b is read, and information on free space or the like is obtained and stored, in steps S05 and S07.

Next, in step S08, the state of the packed state detection switch 118 is checked. That is, whether or not the memory cards 120a, 120b loaded in the adapter 125 are connected is checked. When the packed state detection switch 118 is turned in the memory cards 120a, 120b are considered that they should be handled in pairs, and a packed state flag which is internal data is set to "1" in step S09. When the packed state detection switch 118 is turned off, the memory cards 120a, 120b are considered that they should be handled separately, and the packed state flag which is the internal data is set to "0" in step S10.

Subsequently, in steps S11 and S12, each of the connected memory cards 120a, 120b is checked to see whether or not it has free space on the basis of the FAT information and the like. Here, when it is possible to take one or more images in a currently used image quality mode, it is judged that there is free space. When the memory cards 120a, 120b do not have any free space, a warning notifying of the same is displayed on the operation displaying LCD 57 in step S13.

Next, it is checked in step S21 to see whether or not the mode dial 52c and the setting dial 52b of the camera operating switch 52 are operated to newly set an exposure mode or the like, and when the exposure mode or the like has been newly set, preparatory processing to perform image pickup at the set value is executed in step S22.

Furthermore, if No in step S23, waiting takes place until the release button 52a is operated. If Yes in step S24, that is, if it is detected that the release button 52a is pressed halfway, photometry is performed for exposure calculation in step S25, and in steps S26 and S27, driving of the taking lens 12a of the lens unit 12 is controlled on the basis of the output from the AF sensor unit 30a to perform the focusing operation.

Subsequently, if Yes in step S28, that is, if it is detected that the release button 52a is totally pressed, an exposure operation is performed in step S29. That is, the quick-return mirror 13b and the sub mirror 13d are moved out of an optical path, and the first (front) curtain and the second (rear) curtain of the shutter 14 are controlled, and then an optical image is formed on the CCD 27 only for a predetermined time.

Furthermore, in step S30, the image taken from the CCD 27 and processed by the image processing controller 40 is transferred to and recorded in the recording media 39a, 39b.

Figure 11:
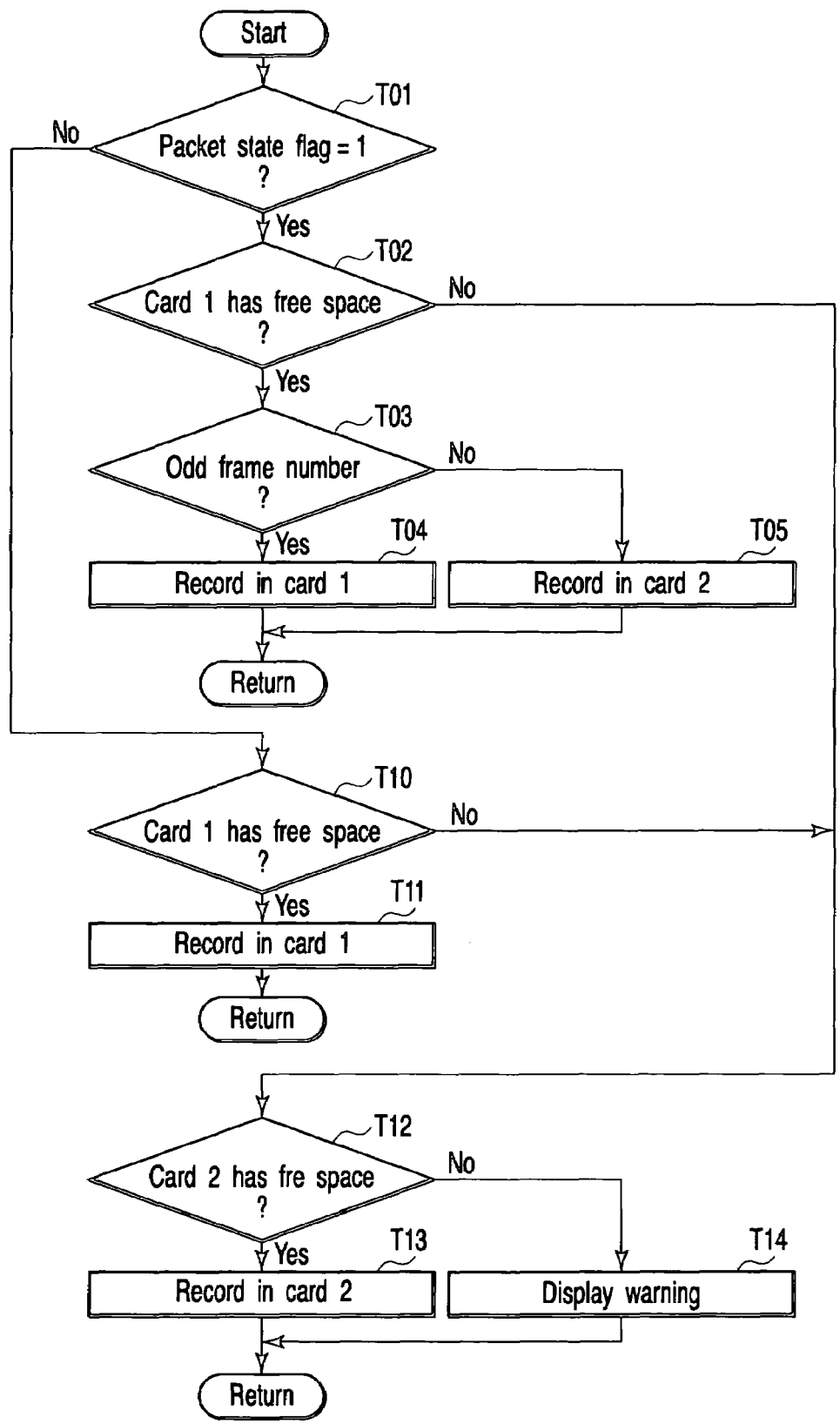
FIG. 11 is a schematic flowchart showing the transfer and recording operations of the image data.

FIG. 11 is a schematic flowchart showing a procedure to record an image in the recording media 39a, 39b.

If Yes in steps T01 and T02, that is, if the packed state flag is checked to find out that the packed state flag is "1" and the memory card 120a has free space, the image is alternately transferred to the memory cards 120a, 120b. For example, if Yes in step T03, that is, if a frame number of the taken image is odd, the image is recorded in the memory card 120a in step T04. If No in step T03, that is, if the frame number of the taken image is even, the image is recorded in the memory card 120b in step T05.

The image is thus recorded alternately to allow simultaneous recording of the image in the memory cards 120a, 120b, thereby enabling a reduction in data transfer time.

However, if No in step T02, that is, if the memory card 120a does not have any free space, the image cannot be transferred alternately. Therefore, steps after step T12 hereinafter described are then executed so that the image is transferred to the memory card 120b.

If No in step T01, that is, if the packed state flag is checked to find out that the packed state flag is "0", the image is recorded in one of the memory cards.

Thus, if Yes in step T10, that is, if the memory card 120a has free space, the image is recorded in the memory card 120a in step T11. If, however, the memory card 120a does not have any free space, the memory card 120b is checked to see whether or not it has free space in step T12.

If Yes in step T12, that is, if the memory card 120b has free space, the image is recorded in the memory card 120b in step T13. If, however, the memory card 120b does not have any free space, a warning notifying that the image cannot be recorded is displayed on the operation displaying LCD 57 in step S14. It is to be noted that this judgment on whether or not there is free space is performed on the basis of the size of the image actually taken.

Furthermore, in the processing shown in FIG. 11, the processing shown in steps T01 to T05 in which the image is allocated to and recorded in the memory cards 120a, 120b may be performed when the digital camera is taking an image in the sequential taking mode. In the sequential taking mode, many images are produced in a short period of time, so that it is necessary to efficiently write them into the memory cards 120a, 120b. However, if not in the sequential taking mode, images are produced at long intervals, so that the writing into the recording media matters less.

Figure 9:
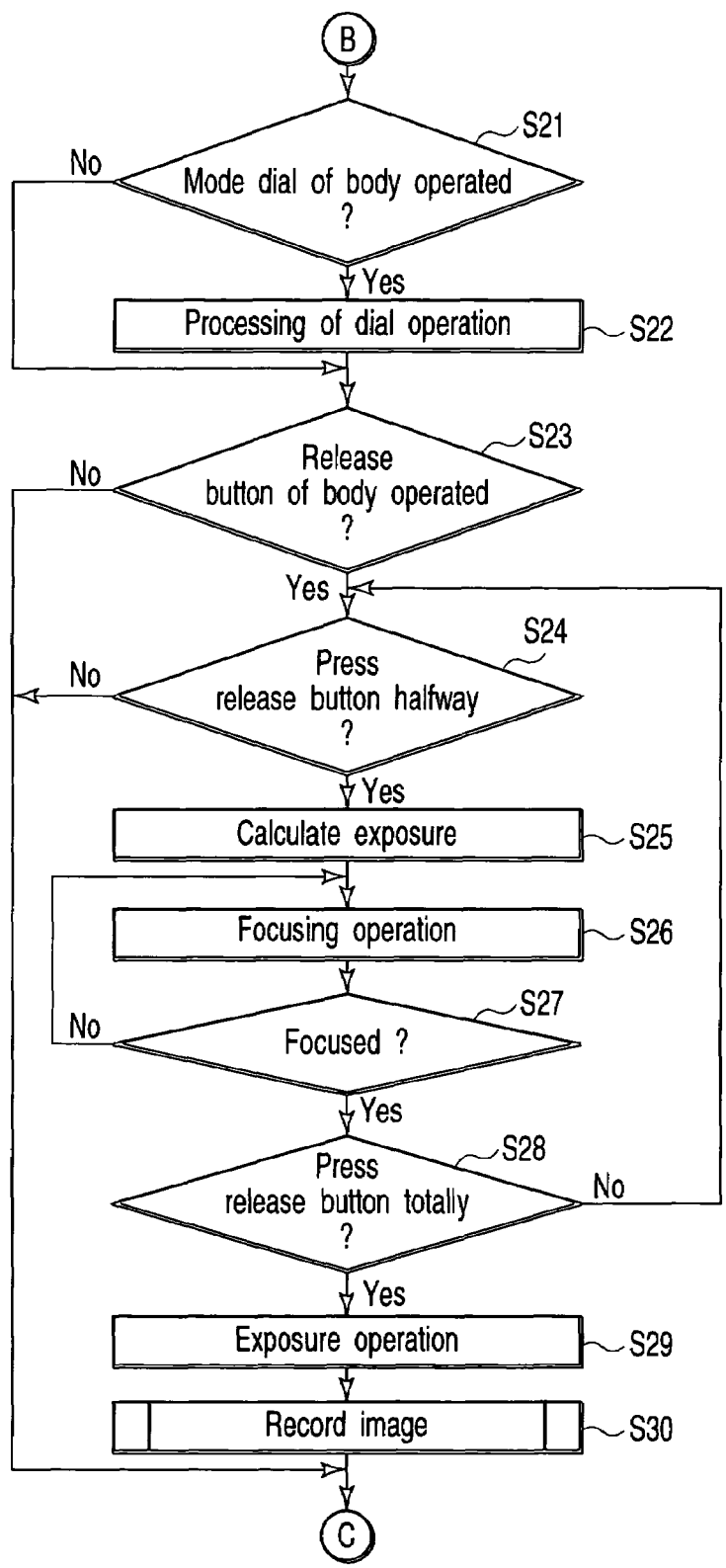
FIG. 9 is a schematic flowchart showing the transfer and recording operations of the image data.

After the processing in step S39 in FIG. 9 has been performed as described above, the image data is moved to a particular recording medium at free time when the photographing operation is not performed.

Figure 10:
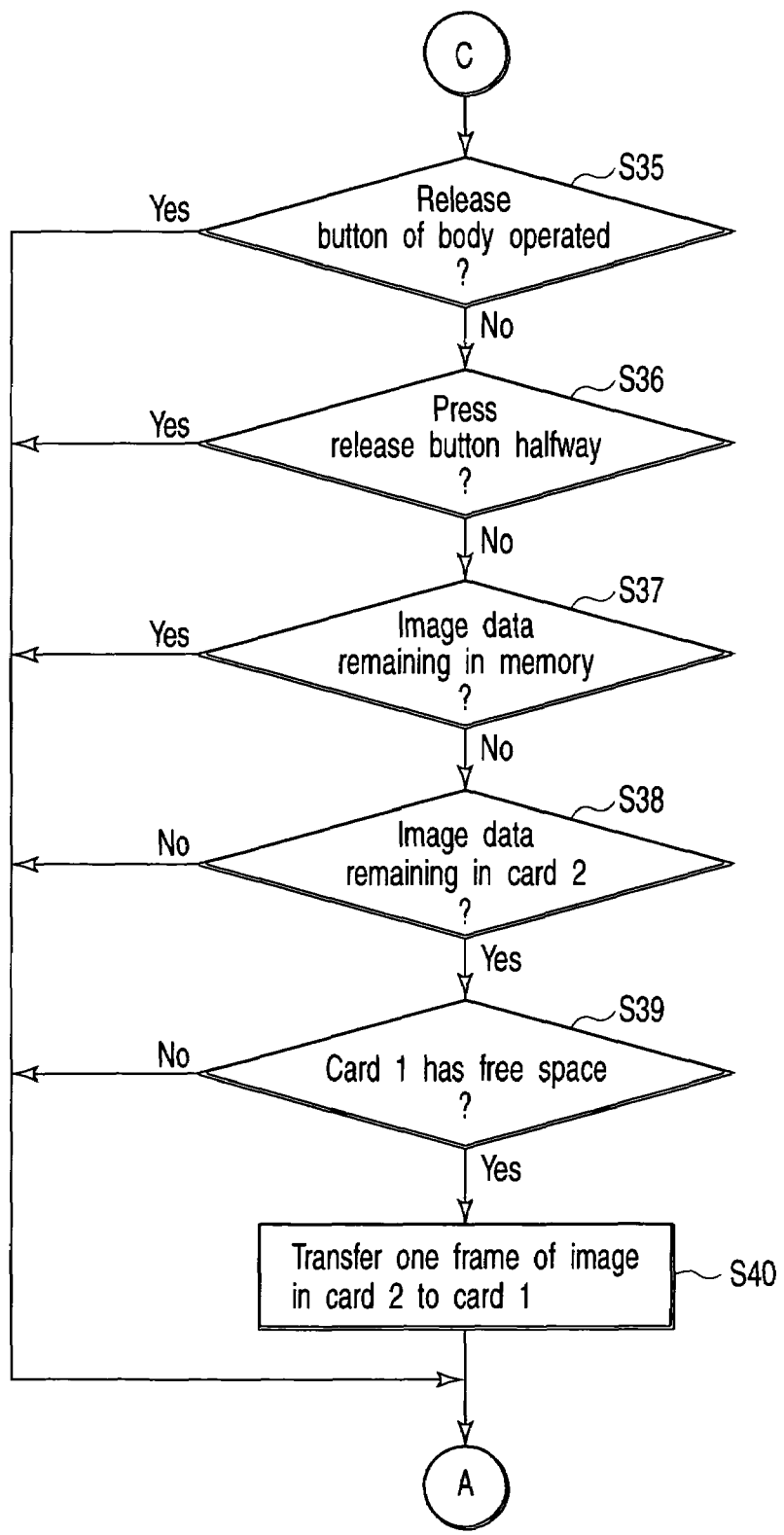
FIG. 10 is a schematic flowchart showing the transfer and recording operations of the image data.

That is, in FIG. 10, if No in step S35 and step S36, that is, if the release button 52a is neither operated nor pressed halfway, it is checked in step S37 to see whether or not the image data is remaining in a buffer.

If Yes in step S37, that is, if the image data is remaining in the buffer, the data is still being transferred to the recording medium, so that this processing to displace data is not performed. If No in step S37, that is, if the image data is not remaining in the buffer, it is checked in step S38 to see whether or not the image data to be displaced remains in the memory card 120b.

If No in step S38, that is, if the image data to be displaced does not remain in the memory card 120b, the displacement has already completed, and thus a further displacement operation is not performed.

Furthermore, if Yes in step S38 and step S39, that is, if the image data to be displaced is remaining in the memory card 120b and the memory card 120a has free space, one frame of the image in the memory card 120b is displaced to the memory card 120a in step S40.

Figure 8:
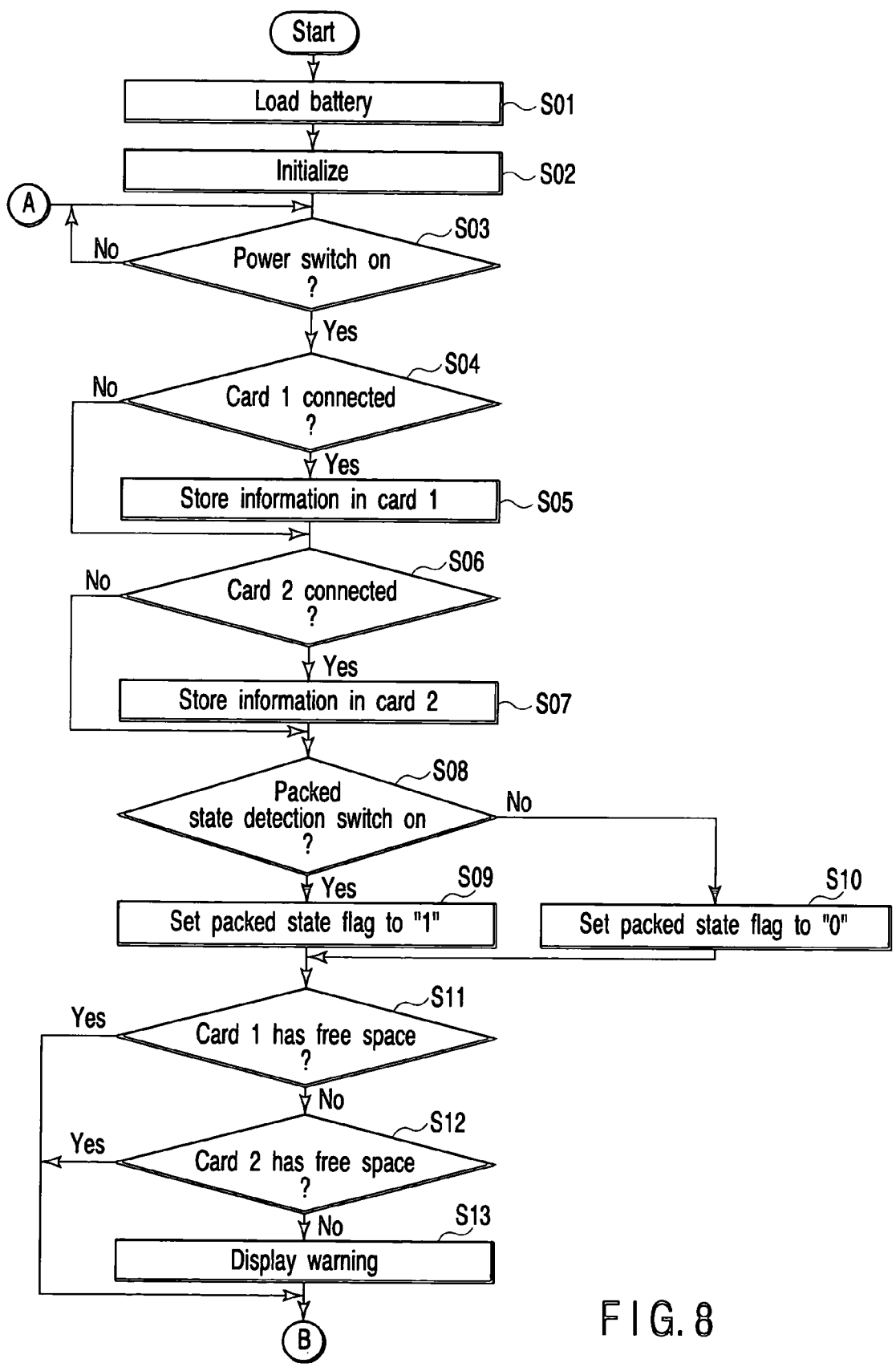
FIG. 8 is a schematic flowchart showing transfer and recording operations of the image data.

After one frame of the image data is displaced, the above-described processing is repeated back to step S03 in FIG. 8.

Figure 12:
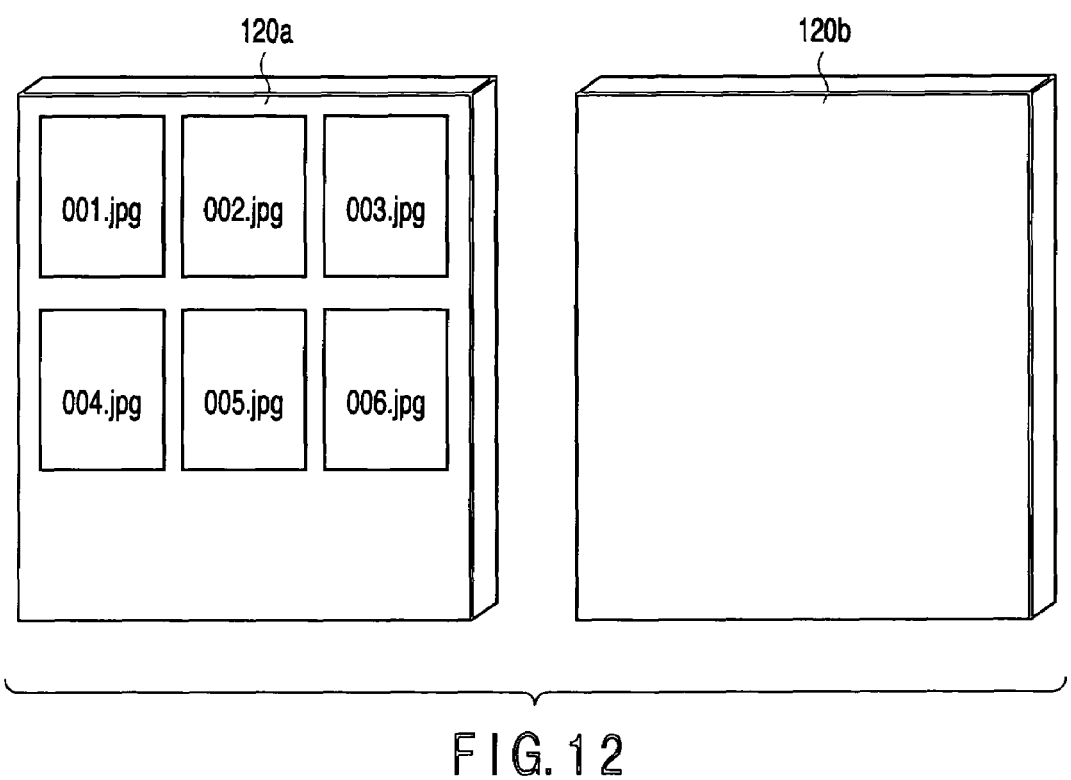
FIG. 12 is a diagram showing image data recorded in the memory cards.

FIG. 12 is a diagram showing image data recorded in the memory cards. The image data in the memory card 120b has been totally displaced to the memory card 120a. According to this embodiment, a plurality of memory cards is used during data recording to reduce the transfer time, and then the free space is utilized to integrate the data into one memory card. The user can thus manage data easily.

Next, a procedure for data exchange between the recording media 39a, 39b and the image processing controller 40 will be described.

FIG. 13 is a diagram showing signal connection between the recording media 39a, 39b and the image processing controller 40.

The image processing controller 40 and the communication connector 35a of the recording medium 39a is connected by address signals (A000 to A009), data signals (D000 to D015), a Write signal (WR0), a Wait signal (WAIT0) and a Chip_enable signal (CE0).

The address signals (A000 to A009) are signals for the image processing controller 40 to specify an address with which to write the image data into the recording medium 39a.

The data signals (D000 to D015) are signals for the image processing controller 40 to represent data to be transferred to the recording medium 39a.

The Write signal (WR0) is a signal for the image processing controller 40 to specify timing with which to read data from the recording medium 39a. The Wait signal (WAIT0) is a signal for the recording medium 39a to request the image processing controller 40 to temporarily stop transfer of data. The Chip_enable signal (CE0) is a signal to indicate that the image processing controller 40 selects the recording medium 39a as a destination.

In the same manner, the image processing controller 40 and the communication connector 35b of the recording medium 39b is connected by address signals (A100 to A109), data signals (D100 to D115), a Write signal (WR1), a Wait signal (WAIT1) and a Chip_enable signal (CE1). The contents of these signals are the same as those of the signals between the image processing controller 40 and the communication connector 35a and will not be described in detail.

Figure 14:
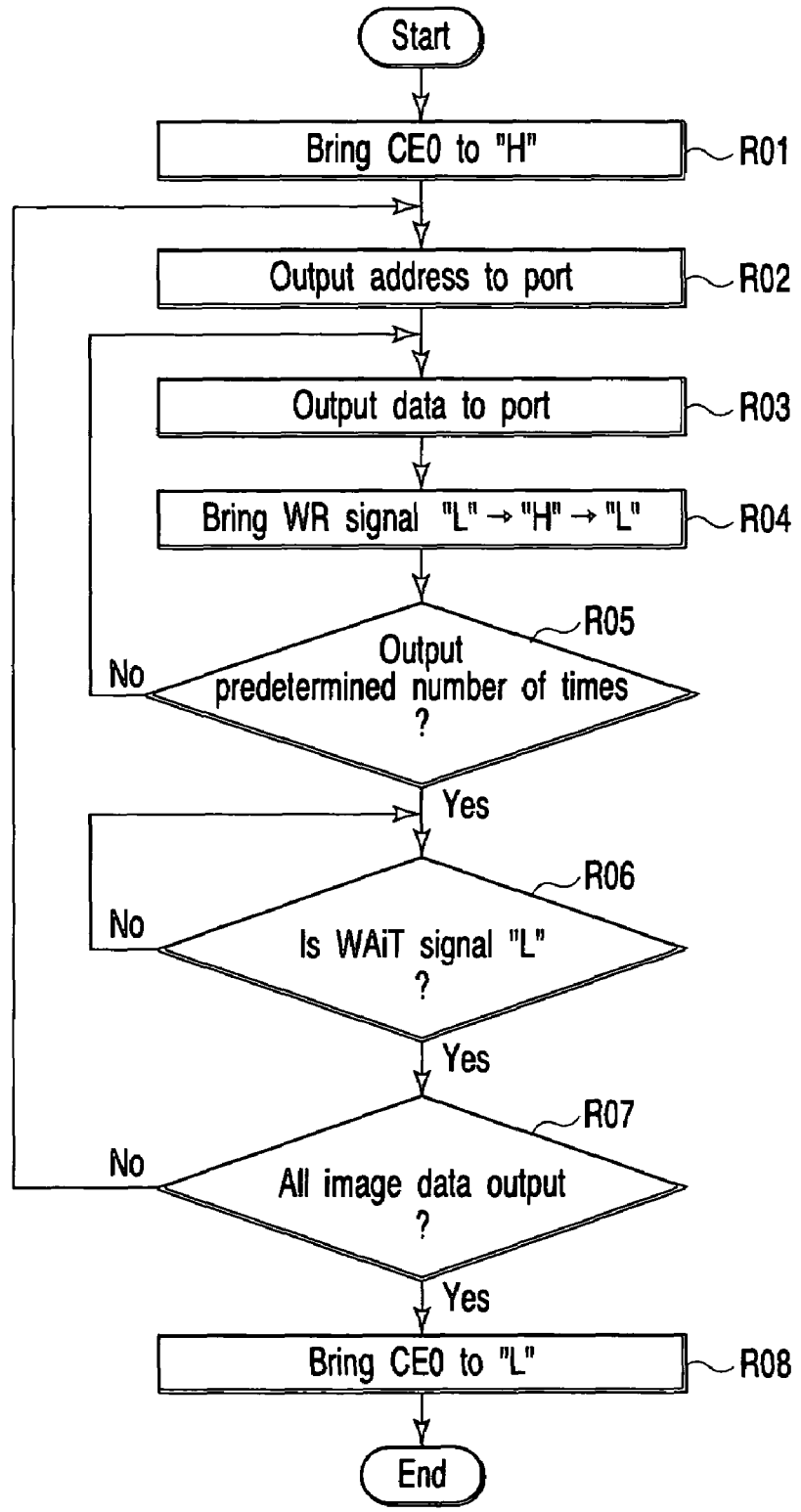
FIG. 14 is a flowchart showing a procedure in the image processing controller to exchange data with the recording medium.

FIG. 14 is a flowchart showing a procedure in the image processing controller 40 to exchange data with the recording medium 39a. FIG. 15 is a diagram representing a timing chart of data exchange signals between the image processing controller 40 and the recording medium 39a. A data exchange operation will be described referring to FIG. 14, FIG. 15.

In step R01, the image processing controller 40 brings the Chip_enable signal (CE0) to a "H" level to notify that the data will be transferred to the recording medium 39a. The recording medium 39a prepares to receive data.

Next, in step R02, the image processing controller 40 outputs to an address port the addresses (A000 to A009) to write the image data. Here, address information to write image data has been obtained by the image processing controller 40 through a communication (not shown) performed before the start of this data exchange operation.

Subsequently, the image processing controller 40 divides the image data to be transferred into a plurality of data. Then, with each of the divided data as a unit for each transmission, transmission is repeated to transfer the image data to the recording medium 39a.

In steps R03, R04, the image processing controller 40 outputs the initial data (D000 to D015) to a data port. Then, at the time when the output is stabilized, the Write signal (WR0) is output in a pulsed manner. Here, time t1 which is the pulse width and time t2 which is the pulse period are optimum values that differ depending on the kind of the recording medium 39a. The recording medium 39a reads the data (D000 to D015) set at the time when the Write signal (WR0) is input.

In step R05, this processing is repeated for a predetermined number of times, and the data transmission of a first transfer unit is performed. Therefore, if a predetermined number of times is 32, 16 bits×32=512 bits, that is, 64 bytes are the amount of data that is transferred in one transmission.

The recording medium 39a which has received the data for one transmission unit starts writing data received from the specified addresses (A000 to A009) of the memory card 120a. Along with this, the Wait signal (WAIT0) is brought to the "H" level.

In step R06, the image processing controller 40 temporarily stops the data transfer until the Wait signal (WAIT0) reaches the "L" level. When the Wait signal (WAIT0) has reached the "L" level, the addresses (A000 to A009) to be written next are calculated and output to the address port, thus starting data transfer for the next transmission unit, in steps R02 to R05.

The above transmission procedure is repeated, and if Yes in step R07, that is, if all the image data has been output, the Chip_enable signal (CE0) is brought to the "L" level to notify that the data transfer to the recording medium 39a has finished, in step R08. The image processing controller 40 also transmits the image data to the recording medium 39b in accordance with the similar procedure.

According to this embodiment, the image processing controller 40 can transmit data independently to the recording medium 39a and the recording medium 39b, thereby enabling a reduction in the data transfer time.

FIG. 16 is a diagram showing another example of signal connection between the recording media 39a, 39b and the image processing controller 40.

In this example, only one system of address signals (A00 to A09) and data signals (D00 to D15) is provided in the output of the image processing controller 40. Further, part of the data signals (D00 to D10) and the address signals (A00 to A09) are shared to reduce the number of output ports.

Furthermore, address signal latch circuits 141a, 141b and data signal latch circuits 142a, 142b are newly provided so that the address signals (A00 to A09) and the data signals (D00 to D15) are interfaced with the recording media 39a, 39b. Further, address latch signals (LATCH_A0, LATCH_A1) and data latch signals (LATCH_D0, LATCH_D1) are provided in the output of the image processing controller 40.

Figures 17A, 17B:
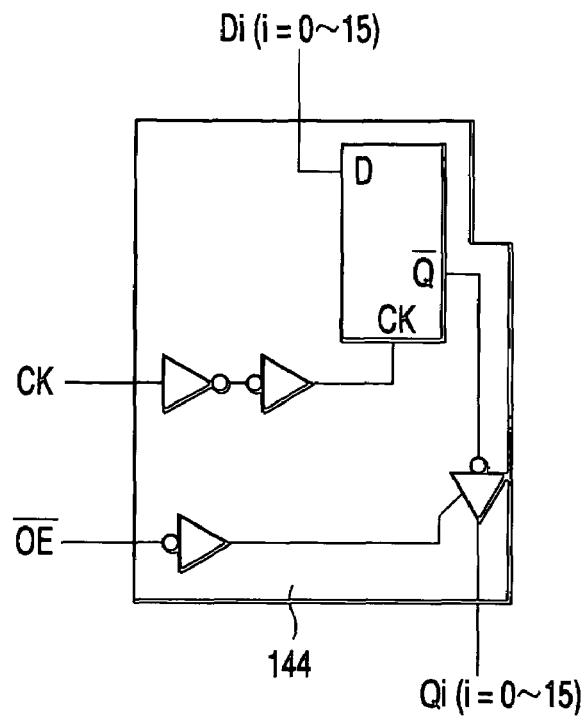
FIG. 17A is a diagram explaining the operation of a latch circuit.
FIG. 17B is a diagram explaining the operation of the latch circuit.

FIG. 17A, 17B are diagrams explaining the operation of the latch circuit. FIG. 17A shows an internal configuration of the latch circuit. FIG. 17B shows a truth table for the input/output operation of a part of a latch circuit 144 used for the latch circuit.

In FIG. 17A, D0, D1, . . . represent input data, and Q0, Q1, . . . represent output data. Further, CK is a latch signal, and $\overline{OE}$ is an output enable signal. It is to be noted that the output enable signal has a bar added on top of OE in the drawing.

According to the truth table of FIG. 17B, when the output enable signal ($\overline{OE}$) is at the "H" level, the output data (Q0) is fixed in a high impedance state. That is, the output value of the latch circuit 144 is always in a reset state.

On the other hand, when the output enable signal ($\overline{OE}$) is at the "L" level and the latch signal (CK) has changed from "L" to "H", the state of the input data (D0) is set in the output data (Q0).

Moreover, when the output enable signal ($\overline{OE}$) is at the "L" level and the latch signal (CK) has changed from "H" to "L", the output data (Q0) maintains its state. That is, the output data is in a latched state.

Figure 18:
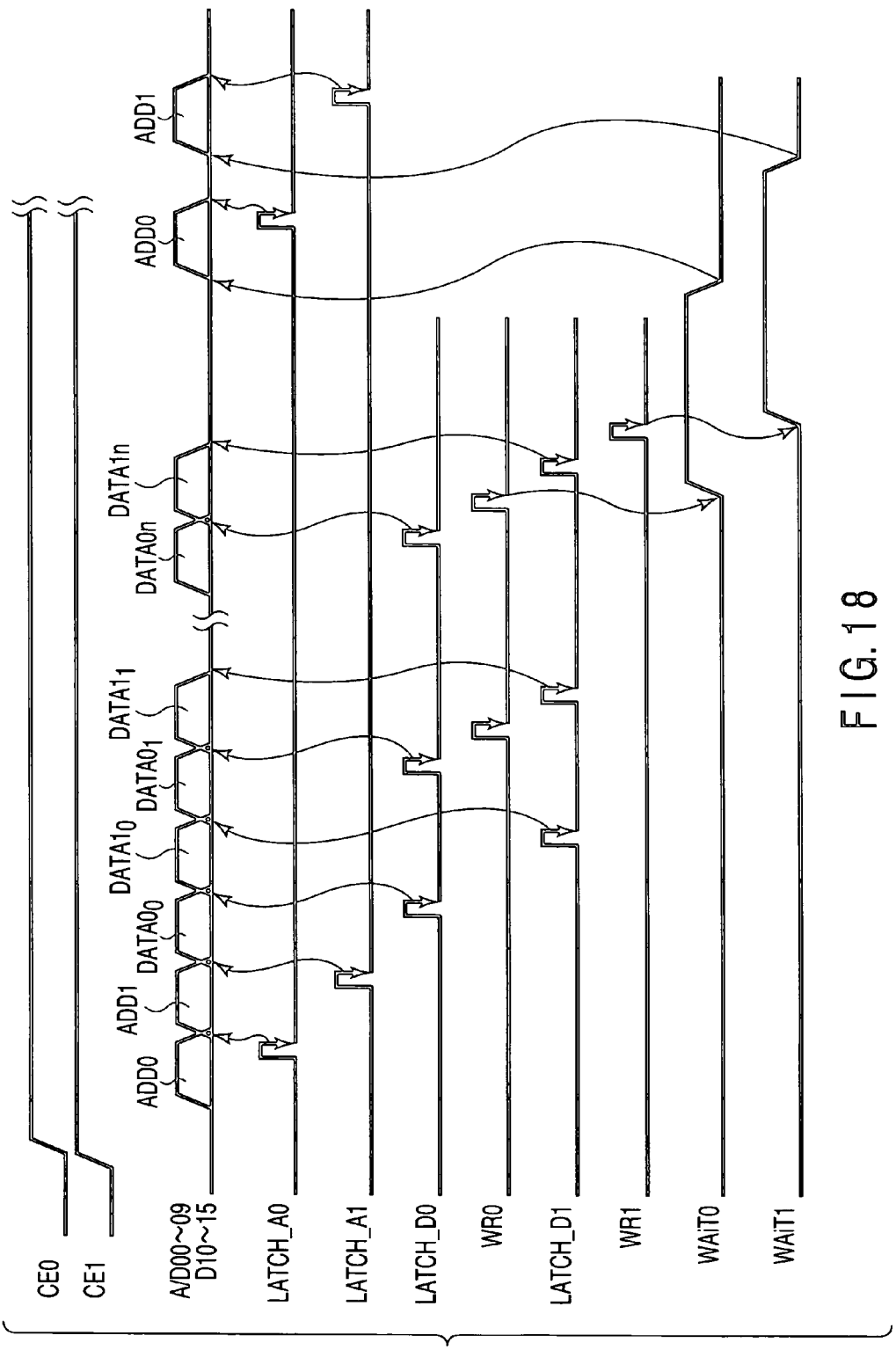
FIG. 18 is a diagram representing a timing chart of the data exchange signals between the image processing controller and the recording media.

FIG. 18 is a diagram representing a timing chart of the data exchange signals between the image processing controller 40 and the recording media 39a, 39b.

The image processing controller 40 brings the Chip_enable signals (CE0, CE1) to the "H" level to notify that the data will be transferred to the recording media 39a, 39b. The recording media 39a, 39b prepare to receive data.

Next, the image processing controller 40 outputs to the address port the addresses (A00 to A09) to write the image data into the recording medium 39a. Here, address information to write image data has been obtained by the image processing controller 40 through a communication (not shown) performed before the start of this data exchange operation.

Furthermore, the image processing controller 40 outputs the address latch signal (LATCH_A0) in a pulsed manner. As described above, at the time when the address latch signal (LATCH_A0) changes from "H" to "L", the output of the latch circuit 141a is retained, and an address is set in the recording medium 39a.

Therefore, the image processing controller 40 outputs to the address port the addresses (A00 to A09) to write the image data into the recording medium 39b. Further, the image processing controller 40 outputs the address latch signal (LATCH_A1) in a pulsed manner. As described above, at the time when the address latch signal (LATCH_A1) changes from "H" to "L", the output of the latch circuit 141b is retained, and an address is set in the recording medium 39b.

Subsequently, the image processing controller 40 divides the image data to be transferred into a plurality of data, and with each of the divided data as a unit for each transmission, transmission is repeated to transfer the image data to the recording medium 39a and the recording medium 39b.

The image processing controller 40 outputs, to the data ports (D00 to D15), initial data to be transferred to the recording medium 39a, and outputs the data latch signal (LATCH_D0) in a pulsed manner. As described above, at the time when the data latch signal (LATCH_D0) changes from "H" to "L", the output of the latch circuit 142a is retained, and data is set in the recording medium 39a. At the time when the output is stabilized, the image processing controller 40 outputs the Write signal (WR0) in a pulsed manner. The recording medium 39a reads the data (D000 to D015) set at the time when the Write signal (WR0) is input.

The image processing controller 40 outputs, to the data ports (D00 to D15), initial data to be transferred to the recording medium 39b, and outputs the data latch signal (LATCH_D1) in a pulsed manner. As described above, at the time when the data latch signal (LATCH_D1) changes from "H" to "L", the output of the latch circuit 142b is retained, and data is set in the recording medium 39b. At the time when the output is stabilized, the image processing controller 40 outputs the Write signal (WR1) in a pulsed manner. The recording medium 39b reads the data (D000 to D015) set at the time when the Write signal (WR1) is input.

This processing is repeated for a predetermined number of times, and the data transmission of the first transfer unit to the recording media 39a, 39b is performed. The recording media 39a, 39b which have received the data for one transmission unit start writing data received from the specified addresses (A000 to A009, A100 to A109) of the data memories 120a, 120b. Along with this, the Wait signals (WAIT0, WAIT1) are brought to the "H" level.

The image processing controller 40 temporarily stops the data transfer until the Wait signals (WAIT0, WAIT1) reach the "L" level. When the Wait signals (WAIT0, WAIT1) have reached the "L" level, the addresses (A000 to A009) to be written next are calculated and output to the address port. Thus, data transfer for the next transmission unit is started.

The above transmission procedure is repeated, and when all the image data has been output, the Chip_enable signals (CE0, CE1) are brought to the "L" level to notify that the data transfer to the recording media 39a, 39b has finished.

Such a circuit configuration enables a reduction in the number of output ports of the image processing controller 40, in addition to effects of the circuit configuration described above.

Figure 19:
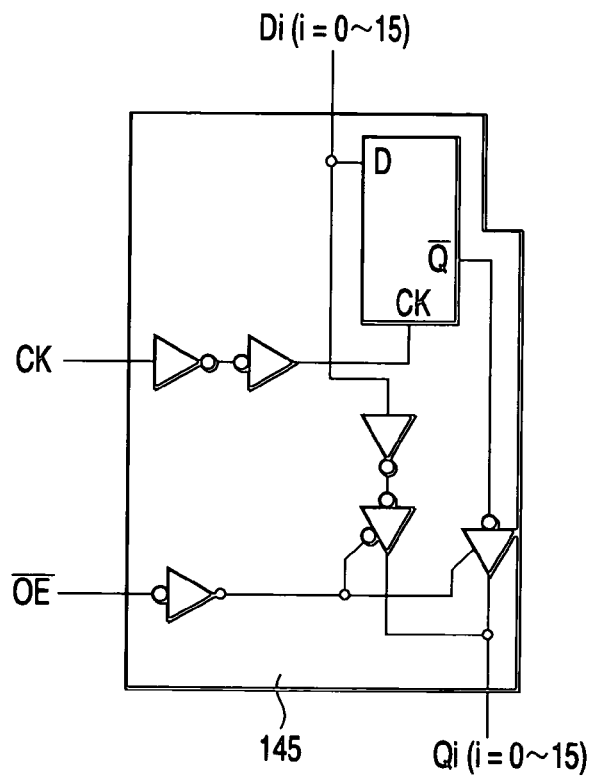
FIG. 19 is a diagram showing the signal connection between the image processing controller and a latch circuit which is a part of a data latch circuit.

FIG. 19 is a diagram showing another example of signal connection between the image processing controller 40 and a latch circuit 145 which is a part of the data latch circuit 142a. In this example, the image processing controller 40 controls the levels "H", "L" of the output enable signal ($\overline{OE}$) to enable switching; data is output after latched or without being latched.

That is, when the output enable signal ($\overline{OE}$) is at the "L" level, a signal retained by the latch signal (LATCH) is output as the output data of the part of the latch circuit 145, as described with regard to the circuit shown in FIG. 17A.

On the other hand, when the output enable signal ($\overline{OE}$) is at the "H" level, the output data of the part of the latch circuit 145 is reset, as described with regard to the circuits shown in FIG. 17. In this case, data signals from circuits other than the part of the latch circuit 145 are output by the output enable signal ($\overline{OE}$).

Using this latch circuit, data can be transferred as in the above-described embodiment when there is a plurality of recording media, or data can be transferred, when there is one recording medium, using the Write signal (WR0) alone without using the latch signal because the data does not need to be latched.

Figure 20:
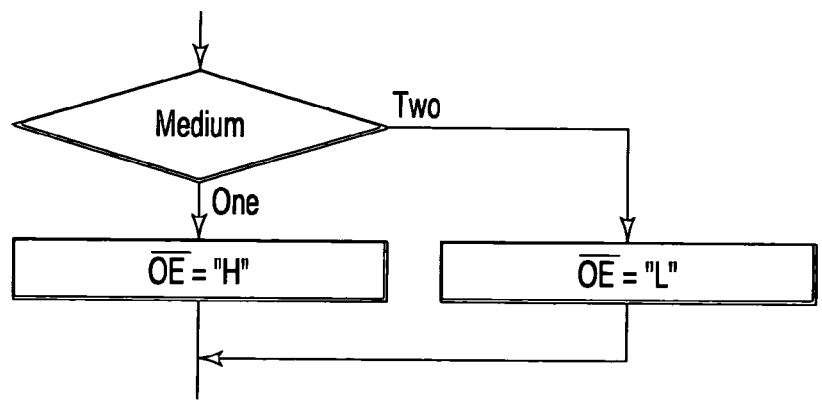
FIG. 20 is a flowchart showing a data output operation.

That is, as shown in FIG. 20, the output enable signal ($\overline{OE}$) is brought to the "H" level in the case of one medium, and the output enable signal ($\overline{OE}$) is brought to the "L" level in the case of a plurality of media, thereby enabling the above-described operation.

Figure 21:
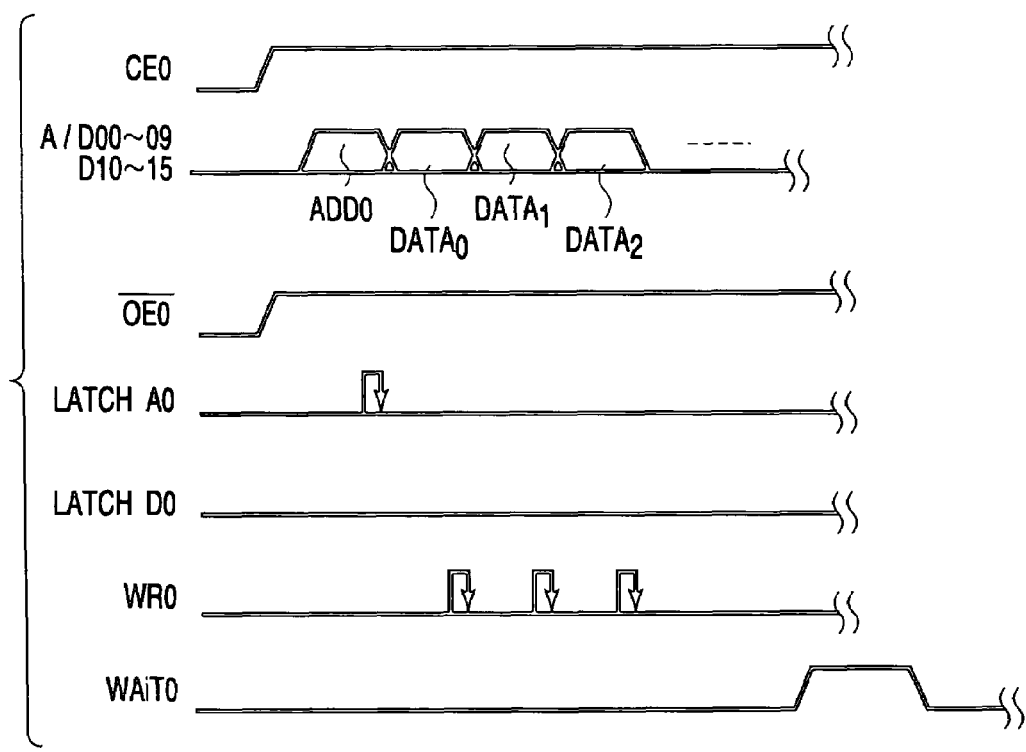
FIG. 21 is a diagram representing a timing chart of the signals when the image processing controller exchanges data only with the recording medium.

FIG. 21 is a diagram representing a timing chart of the signals when the image processing controller 40 exchanges data only with the recording medium 39a. That is, it represents an operation for data exchange with one recording medium.

The image processing controller 40 brings the Chip_enable signal (CE0) to the "H" level to notify that the data will be transferred to the recording media 39a. The recording media 39a prepares to receive data.

Next, the image processing controller 40 outputs to the address port the addresses (AD0 to A09) to write the image data into the recording medium 39a. Here, address information to write image data has been obtained by the image processing controller 40 through a communication (not shown) performed before the start of this data exchange operation.

The image processing controller 40 outputs the address latch signal (LATCH_A0) in a pulsed manner. As described above, at the time when the address latch signal (LATCH_A0) changes from "H" to "L", the output of the latch circuit 141a is retained, and an address is set in the recording medium 39a.

Subsequently, the image processing controller 40 divides the image data to be transferred into a plurality of data, and with each of the divided data as a unit for each transmission, transmission is repeated to transfer the image data to the recording medium 39a.

Therefore, the image processing controller 40 brings the output enable signal ($\overline{OE}$) to the "H" level. Thus, the data goes through the latch circuit and is output to the recording medium 39a as described with regard to the circuit shown in FIG. 19.

The image processing controller 40 outputs to the data port the initial data (D00 to D15) to be transferred to the recording medium 39a. Then, at the time when the output is stabilized, the Write signal (WR0) is output in a pulsed manner. The recording medium 39a reads the data (D000 to D015) set at the time when the Write signal (WR0) is input.

This processing is repeated for a predetermined number of times, and the data transmission of the first transfer unit to the recording media 39a is performed. The recording media 39a which has received the data for one transmission unit starts writing data received from the specified addresses (A000 to A009) of the data memory 120a, and along with this, the Wait signal (WAIT0) is brought to the "H" level.

Subsequently, the operation similar to the operation in the above-described circuit example is performed. That is, the image processing controller 40 temporarily stops the data transfer until the Wait signal (WAIT0) reaches the "L" level. When the Wait signal (WAIT0) has reached the "L" level, the addresses (A000 to A009) to be written next are calculated and output to the address port, thus starting data transfer for the next transmission unit. The above transmission procedure is repeated, and when all the image data has been output, the Chip_enable signals (CE0, CE1) are brought to the "L" level to notify that the data transfer to the recording medium 39*a* has finished.

According to this circuit example, data transfer methods can be easily switched and used suitable for the number of recording media.

FIG. 22 is a diagram showing another example of signal connection between the recording media 39*a*, 39*b* and the image processing controller 40.

In this example, only one system of the address signals (ADD to A09) and the data signals (D00 to D15) is provided in the output port of the image processing controller 40. Further, part of the data signals (D00 to D10) and the address signals (AD0 to A09) are shared to reduce the number of output ports.

Furthermore, in order to interface the address signals (ADD to A09) with the recording media 39*a*, 39*b*, the address signal latch circuits 141*a*, 141*b* are provided, and the address latch signals (LATCH_0, LATCH_1) are provided in the output of the image processing controller 40.

On the other hand, the data signals (D0D to D15) are directly connected to the recording media 39*a*, 39*b* on a common signal line without the latch circuit in between.

FIG. 23 is a diagram representing a timing chart of the data exchange signals between the image processing controller 40 and the recording media 39*a*, 39*b*.

The image processing controller 40 brings the Chip_enable signals (CE0, CE1) to the "H" level to notify that the data will be transferred to the recording media 39*a*, 39*b*. The recording media 39*a*, 39*b* prepare to receive data.

Next, the image processing controller 40 outputs to the address port the addresses (A00 to A09) to write the image data into the recording medium 39*a*. Here, address information to write image data has been obtained by the image processing controller 40 through a communication (not shown) performed before the start of this data exchange operation.

Furthermore, the image processing controller 40 outputs the address latch signal (LATCH0) in a pulsed manner. As described above, at the time when the address latch signal (LATCH0) changes from "H" to "L", the output of the latch circuit 141*a* is retained, and an address is set in the recording medium 39*a*.

Subsequently, the image processing controller 40 outputs to the address port the addresses (A00 to A09) to write the image data into the recording medium 39*b*. Further, the image processing controller 40 outputs the address latch signal (LATCH1) in a pulsed manner. As described above, at the time when the address latch signal (LATCH1) changes from "H" to "L", the output of the latch circuit 141*b* is retained, and an address is set in the recording medium 39*b*.

Subsequently, the image processing controller 40 divides the image data to be transferred into a plurality of data, and with each of the divided data as a unit for each transmission, transmission is repeated to transfer the image data to the recording medium.

The image processing controller 40 outputs to the data port (D00 to D15) the initial data to be transferred to the recording medium 39*a*. Then, at the time when the output is stabilized, the image processing controller 40 outputs the Write signal (WR0) in a pulsed manner. The recording medium 39*a* reads the data (D000 to D015) set at the time when the Write signal (WR0) is input.

Next, the image processing controller 40 outputs to the data port (D00 to D15) the initial data to be transferred to the recording medium 39*b*, and, at the time when the output is stabilized, outputs the Write signal (WR1) in a pulsed manner. The recording medium 39*b* reads the data (D100 to D115) set at the time when the Write signal (WR1) is input.

The above processing is repeated for a predetermined number of times, and the data transmission of the first transfer unit to the recording media 39*a*, 39*b* is performed. The recording media 39*a*, 39*b* which have received the data for one transmission unit start writing data received from the specified addresses (A000 to A009, A100 to A109) of the data memories 120*a*, 120*b*. Along with this, the Wait signals (WAIT0, WAIT1) are brought to the "H" level.

The image processing controller 40 temporarily stops the data transfer until the Wait signals (WAIT0, WAIT1) reach the "L" level. When the Wait signals (WAIT0, WAIT1) have reached the "L" level, the addresses (AD0 to A09) to be written next are calculated and output to the address port, thus starting data transfer for the next transmission unit.

The above transmission procedure is repeated, and when all the image data has been output, the Chip_enable signals (CE0, CE1) are brought to the "L" level to notify that the data transfer to the recording media 39*a*, 39*b* has finished.

This makes it possible to further simplify the circuit configuration.

Incidentally, when a plurality of recording media is used in combination, it is preferable that they can be identified as a pair. Therefore, a method will be described which verifies whether or not the memory cards 120 to be inserted into the recording media 39*a*, 39*b* are based on a particular combination. In the embodiment according to the present invention, combination identification information for identification of a predetermined combination is provided in the memory cards 120.

Figure 24:
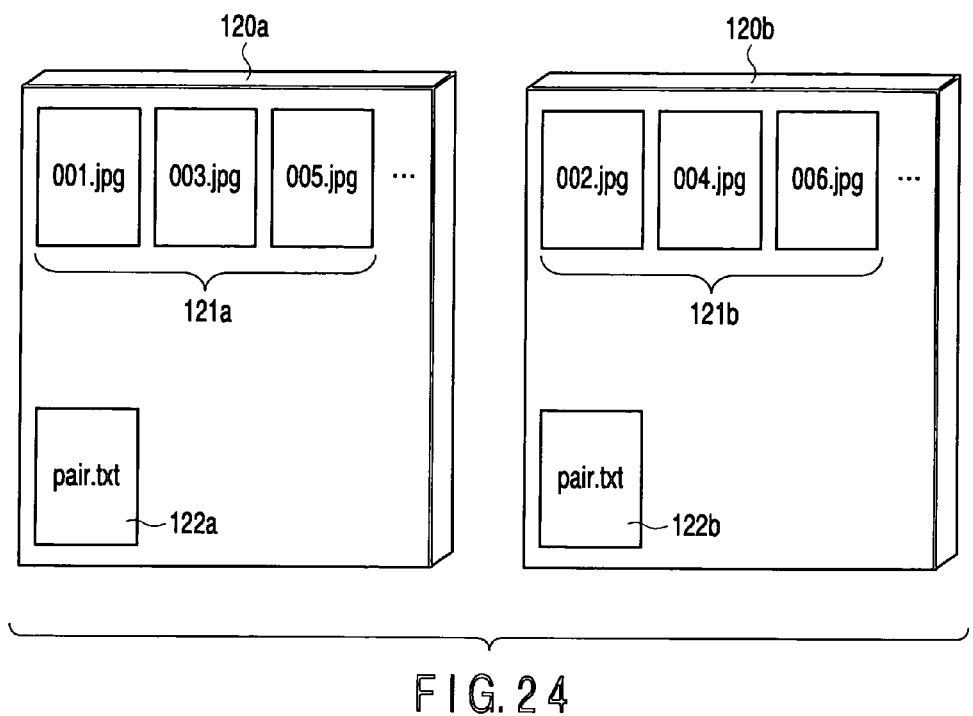
FIG. 24 is a diagram showing one embodiment associated with combination identification information.

FIG. 24 is a diagram showing one embodiment associated with the combination identification information.

In the memory cards 120*a*, 120*b*, exclusive identification files 122*a*, 122*b* are stored together with image data 121*a*, 121*b* allocated by the image processing controller 40. These exclusive identification files 122*a*, 122*b* have the combination identification information indicating that the memory card 120*a* and the memory card 120*b* are based on a predetermined combination.

Figure 25:
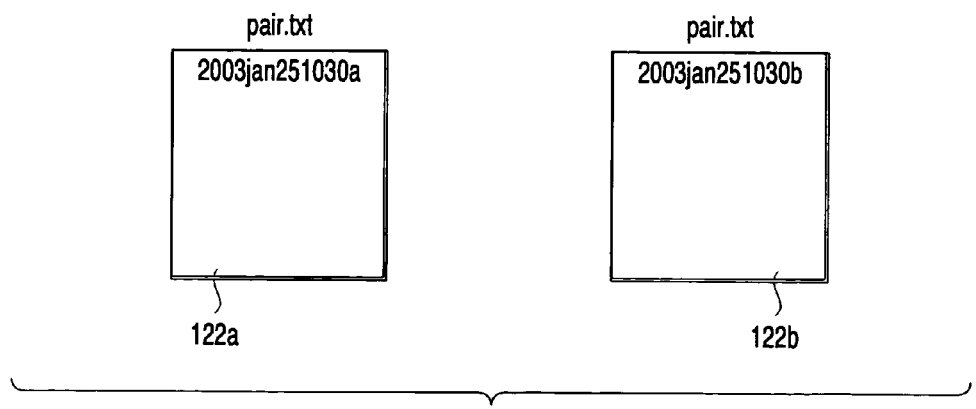
FIG. 25 is a diagram showing exclusive identification files.

The exclusive identification files 122*a*, 122*b* shown in FIG. 25 carry "date+segment code" as the combination identification information. That is, the exclusive identification file 122*a* shown in FIG. 25 carries "2003jan251030" corresponding to the date and time when the file is made and "a" corresponding to the segment code, as the combination identification information. The exclusive identification file 122b shown in FIG. 25 carries "2003jan251030" corresponding to the date and time and "b" corresponding to the segment code, as the combination identification information. Therefore, in this example, it is possible to recognize that the memory cards storing the combination identification information in which the last characters alone are different are based on the predetermined combination.

Figure 26:
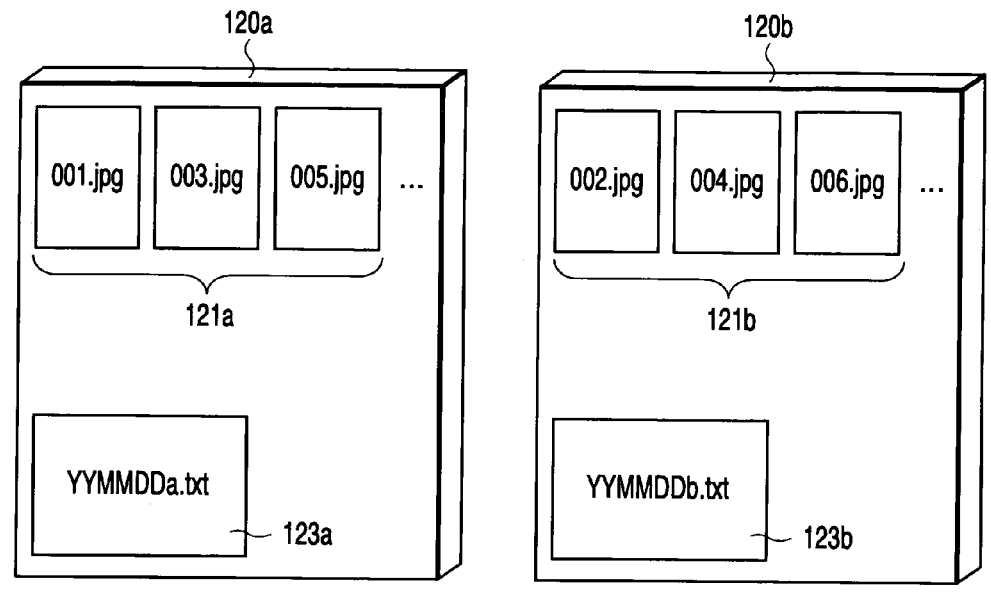
FIG. 26 is a diagram showing another embodiment associated with the combination identification information.

FIG. 26 is a diagram showing another embodiment associated with the combination identification information.

In the memory cards 120*a*, 120*b*, exclusive identification files 123*a*, 123*b* are stored together with the image data 121*a*, 121*b* allocated by the image processing controller 40. For file names of these exclusive identification files 123*a*, 123*b*, the combination identification information is used which indicates that the memory card 120*a* and the memory card 120*b* are based on a predetermined combination.

In the exclusive identification files 123*a*, 123*b* shown in FIG. 26, "date+segment code" is defined as a file name based on the combination identification information. That is, the file name of the exclusive identification file 123*a* is "YYMMDDa" which is a combination of "YYMMDD" corresponding to the date and "a" corresponding to the segment code. The file name of the exclusive identification file 123*b* is "YYMMDDb" which is a combination of "YYMMDD" corresponding to the date and "b" corresponding to the segment code. Therefore, in this example, it is possible to recognize that the memory cards storing the combination identification information in which the last characters alone are different in the file names are based on the predetermined combination.

Figure 27:
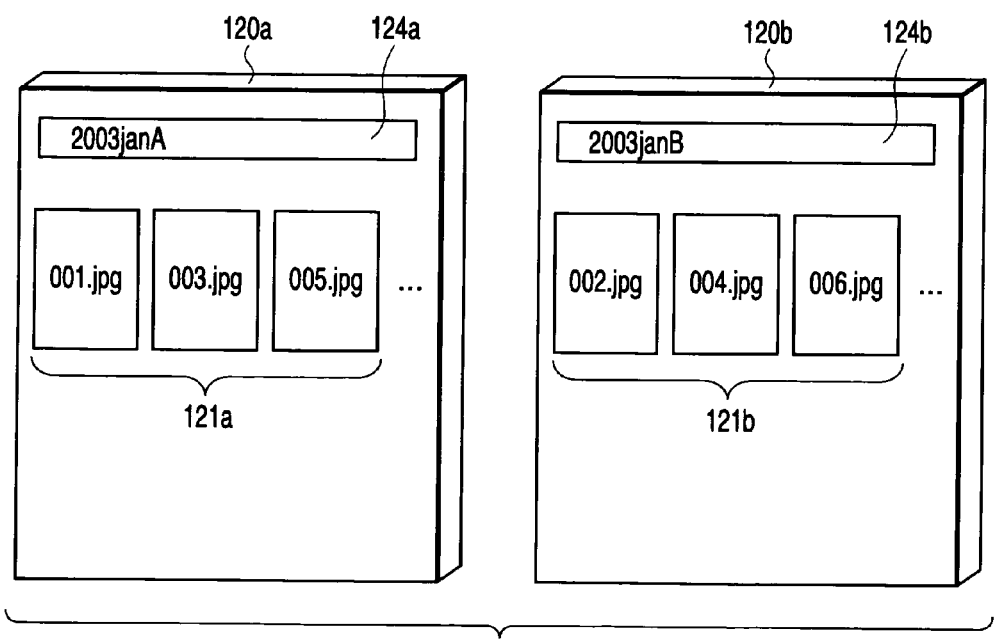
FIG. 27 is a diagram showing another embodiment associated with the combination identification information.

FIG. 27 is a diagram showing another embodiment associated with the combination identification information.

In the memory cards 120*a*, 120*b*, the image data 121*a*, 121*b* allocated by the image processing controller 40 are stored. Further, their volume labels 124*a*, 124*b* carry the combination identification information indicating that the memory card 120*a* and the memory card 120*b* are based on a predetermined combination.

In the volume labels 124*a*, 124*b* shown in FIG. 27, "date+segment code" is defined as label name based on the combination identification information. That is, the file name of the volume label 124*a* is "YYMMDDa" as in the embodiment described above. The file name of the volume label 124*b* is "YYMMDDb" as in the embodiment described above. Therefore, in this example, it is possible to recognize that the memory cards in which the last characters alone are different in the volume names are based on the predetermined combination.

It is to be noted that the combination identification information is not limited to the date information in the embodiments described above, any combination identification information can be applied as long as it uses unified signs. For example, codes generated at random may be used. Moreover, codes generated in other methods can also be used as the combination identification information as long as they are mutually unified and are unique in practical use.

Figure 28:
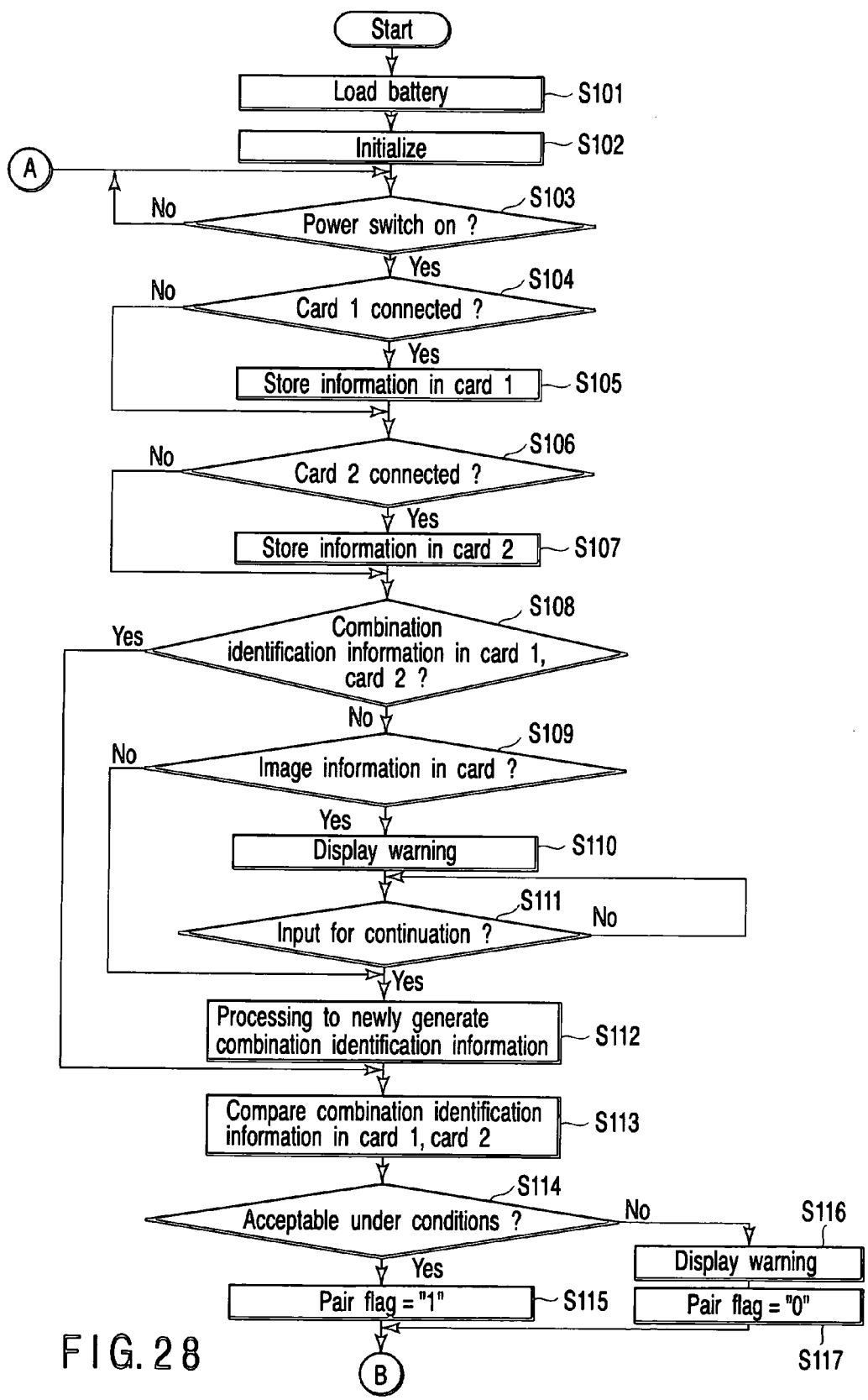
FIG. 28 is a schematic flowchart showing the transfer and recording operations of the image data.
Figure 29:
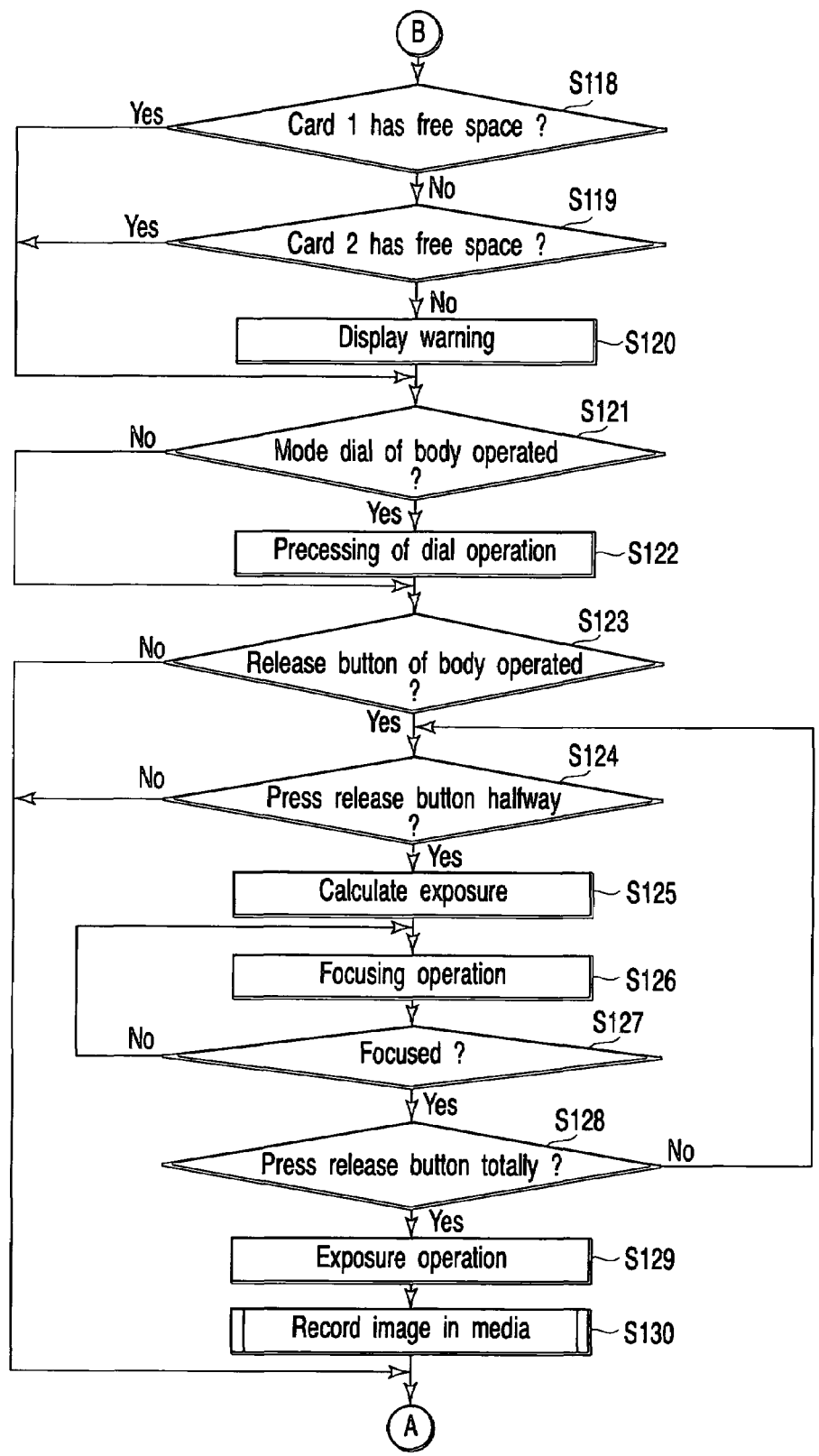
FIG. 29 is a schematic flowchart showing the transfer and recording operations of the image data.
Figure 30:
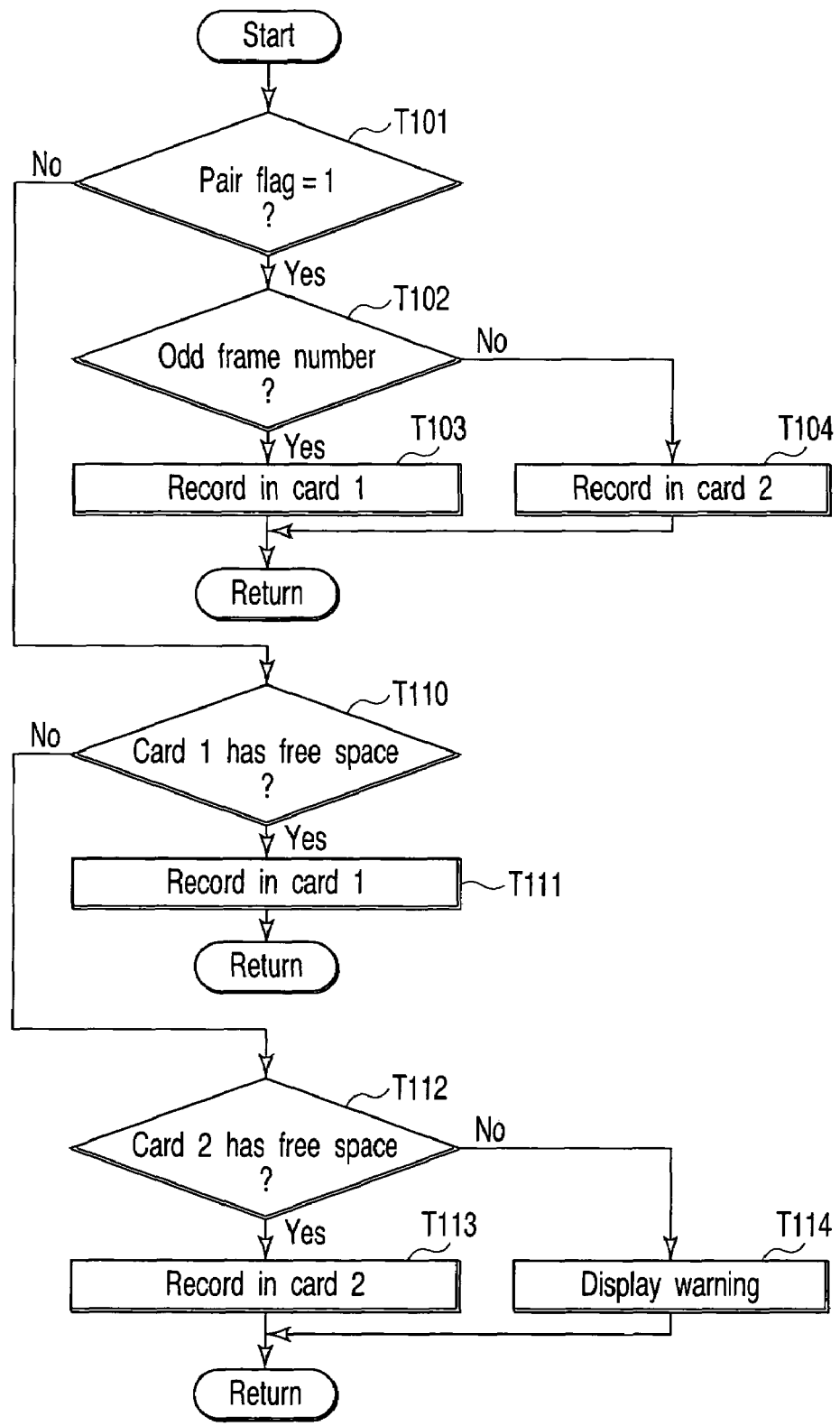
FIG. 30 is a schematic flowchart showing the transfer and recording operations of the image data.

FIG. 28, FIG. 29 and FIG. 30 are schematic flowcharts showing the transfer and recording operations of the image data in the digital camera. These operations are generally controlled by the Bucom 50 shown in FIG. 3.

When the battery of the digital camera is loaded in step S101, the internal data area is initialized in step S102. More specifically, the work areas of the SDRAM 38*a* and the flash ROM 38*b*, and the communication port are initialized.

The state of the power switch 52*d* is checked, and if Yes in step S103, that is, when the power switch 52*d* is turned on and power is supplied to each part of the digital camera leading to an operable state, whether or not the memory cards 120*a* (card 1), 120*b* (card 2) are connected to the recording media 39*a*, 39*b* is checked, in steps S104 and S106.

If Yes in steps S104 and S106, that is, if the memory cards 120*a*, 120*b* are connected, the file allocation table (FAT) information in the connected memory cards 120*a*, 120*b* is read, and information on free space or the like is obtained and stored, in steps S105 and S107.

Next, in step S108, whether or not the memory cards 120*a*, 120*b* have the combination identification information is checked.

If No in step S108 and Yes in step S109, that is, if the memory cards 120*a*, 120*b* do not have the combination identification information and the image data is stored in the memory cards 120*a*, 120*b*, a warning is issued in steps S110 and 111 that the incorrect memory cards 120*a*, 120*b* might be used, and an instruction is additionally displayed on the operation displaying LCD to require an input that indicates whether or not the operation should be continued, thus moving to a standby state.

If the photographer discontinues the operation, he switches off the power switch 52d, changes the memory cards, and starts again the processing from the beginning.

On the other hand, if Yes in step S111, that is., if the photographer inputs to continue the operation, or if No in step S109, that is, if the image data is not stored in the memory cards 120*a*, 120*b*, the combination identification information is newly generated in step S112.

Subsequently, the combination identification information in the memory cards 120*a*, 120*b* is compared to check whether or not they are based on a predetermined combination, in steps S113 and 114.

If Yes in step S114, that is, if they are based on the predetermined combination, a pair flag is set to "1". If No in step S114, that is, if they are not based on the predetermined combination, a warning is displayed in steps S116 and 117 that the incorrect combination of memory cards 120*a*, 120*b* is used, and the pair flag is set to "0".

Subsequently, each of the connected memory cards 120*a*, 120*b* is checked on the basis of the FAT information or the like in steps S118 and 119 to see whether or not it has free space. Here, when it is possible to take one or more images in the currently used image quality mode, it is judged that there is free space. When the memory cards 120*a*, 120*b* do not have any free space, a warning notifying of the same is displayed on the operation displaying LCD 57 in step S120.

Next, it is checked in step S121 to see whether or not the mode dial 52*c* and the setting dial 52*b* of the camera operating switch 52 have been operated to newly set the exposure mode or the like. When the exposure mode or the like has been newly set, preparatory processing to perform image pickup at the set value is executed in step S122.

Furthermore, if No in step S123, waiting takes place until the release button 52*a* is operated. If Yes in step S124, that is, if it is detected that the release button 52*a* is pressed halfway, photometry is performed for exposure calculation in step S125. Then, in steps S126 and S127, the driving of the taking lens 12*a* of the lens unit 12 is controlled on the basis of the output from the AF sensor unit 30*a* to perform the focusing operation.

Subsequently, if Yes in step S128, that is, if it is detected that the release button 52*a* is totally pressed, an exposure operation is performed in step S129. That is, the quick-return mirror 13*b* and the sub mirror 13*d* are moved out of the optical path, and the first (front) curtain and the second (rear) curtain of the shutter 14 are controlled, and then an optical image is formed on the CCD 27 only for a predetermined time.

Furthermore, in step S130, the image taken from the CCD 27 and processed by the image processing controller 40 is transferred to and recorded in the recording media 39*a*, 39*b*.

FIG. 30 is a schematic flowchart showing a procedure to record an image in the recording media 39*a*, 39*b*.

If Yes in step T101, that is, if the pair flag is checked to find out that the pair flag is "1", the image is alternately transferred to the recording media 39*a*, 39*b*. For example, if Yes in step T102, that is, if the frame number of the taken image is odd, the image is recorded in the memory card 120*a* in step T103.

If No in step T102, that is, if the frame number of the taken image is even, the image is recorded in the memory card 120b in step T104.

The image is thus recorded alternately to allow simultaneous recording of the image in the memory cards 120a, 120b. Thereby, the data transfer time can be reduced.

If No in step T101, that is, if the pair flag is checked to find out that the pair flag is "0", the image is recorded in one of the memory cards.

Thus, if Yes in step T110, that is, if the memory card 120a has free space, the image is transferred to the recording medium 39a and recorded in the memory card 120a in step T111. However, If No in step T110, that is, if the memory card 120a does not have any free space, the memory card 120b is checked to see whether or not it has free space in step T112.

If Yes in step T112, that is, if the memory card 120b has free space, the image is transferred to the recording medium 39b and recorded in the memory card 120b in step T113. However, If No in step T112, that is, if the memory card 120b does not have any free space, a warning notifying that the image cannot be recorded is displayed on the operation displaying LCD 57 in step S114. It is to be noted that this judgment on whether or not there is free space is performed on the basis of the size of the image actually taken.

Furthermore, in the processing shown in FIG. 30 where the image is recorded in the recording media 39a, 39b, the processing shown in steps T101 to T104 in which the image is allocated to and recorded in the memory cards 120a, 120b may be performed when the digital camera is taking the image in the sequential taking mode. In the sequential taking mode, many images are produced in a short period, so that it is necessary to efficiently write them into the recording media 39a, 39b. However, if not in the sequential taking mode, images are produced at long intervals, so that the writing into the recording media matters less.

After the processing in step S129 in FIG. 29 has been performed as described above, the above-described processing is repeated back to step S103 in FIG. 28.

It is to be noted that the combination identification information may be folder names instead of file names.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A data recording apparatus comprising:
a recording media loading part which can be loaded with first and second recording media;
a data generating part which is adapted to continuously generate recording data; and
a data recording part which, whenever the recording data is continuously generated from the data generating part, records the recording data in the first and second recording media, alternately, while the first and second recording media is loaded in the recording media loading part;
wherein the data recording part includes a data transfer part which transfers the data recorded in the second recording medium to the first recording medium, such that the data recorded in the second recording medium is integrated with the data recorded in the first recording medium, if the continuous generation of the recording data from the data generating part is interrupted.

2. The data recording apparatus according to claim 1 including a manual operation member,
wherein the data generating part continuously generates the recording data while the manual operation member is operated, and transfers the data recorded in the second recording medium to the first recording medium, such that the data recorded in the second recording medium is integrated with the data recorded in the first recording medium, after the operation of the manual operation member is released.

3. The data recording apparatus according to claim 1, which is a digital camera,
wherein the recording data generated from the data generating part is subject image data taken by an image pickup device.

4. The data recording apparatus according to claim 1, further comprising a judging part which judges whether or not the first and second recording media are loaded in the recording media loading part and whether or not a combination of the first and second recording media is proper,
wherein if the first and second recording media are loaded in the recording media loading part and the combination of the first and second recording media is proper, the data recording part records the recording data in the first and second recording media alternately whenever the recording data is generated from the data generating part.

5. The data recording apparatus according to claim 4, wherein the judging part makes a judgment on the basis of combination identification information recorded in each of the first and second of recording media.

6. The data recording apparatus according to claim 5, wherein the combination identification information is a file name of a file stored in each of the first and second recording media.

7. The data recording apparatus according to claim 5, wherein the combination identification information is a text information of a particular file stored in each of the first and second recording media.

8. The data recording apparatus according to claim 5, wherein the combination identification information is a volume label of the recording media.

9. The data recording apparatus according to claim 5, wherein the combination identification information is a directory name or a folder name.

10. The data recording apparatus according to claim 4, further comprising a warning part which displays a warning when a combination of the first and second of recording media is judged to be improper by the judging part.

11. The data recording apparatus according to claim 4, wherein the data recording part records data to be recorded in one recording medium when the combination of the first and second recording media is judged to be improper by the judging part.

12. The data recording apparatus according to claim 11, wherein the data recording part records the data to be recorded in the other recording medium when the one recording medium has run out of free space.

13. The data recording apparatus according to claim 1, which is a digital camera, wherein the recording data generated from the data generating part is subject image data taken by an image pickup device.

14. A digital camera, comprising:
an image pickup part which picks up an image of a subject light flux through a shooting lens by an image pickup device and outputs an image signal, and which continuously outputs the image signal while a release operation is continued;

an image processor which converts the image signal output from the image pickup part into digital image data;

a controller which controls an operation of the digital camera; and a plurality of recording media that record the digital image data, wherein the controller has a function of recording the digital image data output continuously from the image processor, in order, in different recording media and a function of aggregating the image data recorded in the plurality of recording media, to one recording medium after the release operation is released.

15. The digital camera according to claim 14, where the controller has a function of judging whether or not a combination of the plurality of recording media is proper, and records the digital image data in the plurality of recording media if the controller judges that the combination of the plurality of recording media is proper.

* * * * *